(12) United States Patent
Hattori et al.

(10) Patent No.: US 12,098,287 B2
(45) Date of Patent: Sep. 24, 2024

(54) AZO COMPOUND OR SALT THEREOF, AND DYE-BASED POLARIZING FILM AND DYE-BASED POLARIZING PLATE CONTAINING SAME

(71) Applicant: Nippon Kayaku Kabushiki Kaisha, Tokyo (JP)

(72) Inventors: Yu Hattori, Tokyo (JP); Ryoutarou Morita, Tokyo (JP); Noriaki Mochizuki, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 659 days.

(21) Appl. No.: 17/414,571

(22) PCT Filed: Dec. 17, 2019

(86) PCT No.: PCT/JP2019/049405
§ 371 (c)(1),
(2) Date: Jun. 16, 2021

(87) PCT Pub. No.: WO2020/137705
PCT Pub. Date: Jul. 2, 2020

(65) Prior Publication Data
US 2022/0010139 A1    Jan. 13, 2022

(30) Foreign Application Priority Data

Dec. 27, 2018    (JP) .................. 2018-244988

(51) Int. Cl.
| | | |
|---|---|---|
| C09B 31/18 | (2006.01) | |
| C09B 31/20 | (2006.01) | |
| C09B 31/30 | (2006.01) | |
| G02B 1/08 | (2006.01) | |
| G02B 5/30 | (2006.01) | |

(52) U.S. Cl.
CPC .............. *C09B 31/20* (2013.01); *C09B 31/18* (2013.01); *C09B 31/30* (2013.01); *G02B 1/08* (2013.01); *G02B 5/3025* (2013.01)

(58) Field of Classification Search
CPC ......... C09B 31/18; C09B 31/20; C09B 31/30; G02B 1/08; G02B 5/3025
See application file for complete search history.

(56) References Cited

U.S. PATENT DOCUMENTS

| | | |
|---|---|---|
| 2,488,076 A | 11/1949 | Bossard |
| 2,494,686 A | 1/1950 | Blake |
| 6,140,477 A | 10/2000 | Matsumoto et al. |
| 2004/0063920 A1 | 4/2004 | Kaser et al. |
| 2006/0144288 A1 | 7/2006 | Ohno et al. |
| 2007/0227388 A1 | 10/2007 | Ohno et al. |
| 2009/0118479 A1 | 5/2009 | Ohno et al. |
| 2014/0299020 A1 | 10/2014 | Shimizu et al. |

FOREIGN PATENT DOCUMENTS

| | | | |
|---|---|---|---|
| JP | 60-168743 A | 9/1985 | |
| JP | 63-33477 A | 2/1988 | |
| JP | 2-167791 A | 6/1990 | |
| JP | 5-295282 A | 11/1993 | |
| JP | 06128498 A | * 5/1994 | ............. C09B 31/00 |
| JP | 7-97541 A | 4/1995 | |
| JP | 11-269136 A | 10/1999 | |
| JP | 2001-56412 A | 2/2001 | |
| JP | 2003-64276 A | 3/2003 | |
| JP | 2004-86100 A | 3/2004 | |
| JP | 2004-517189 A | 6/2004 | |
| JP | 2004-285351 A | 10/2004 | |
| JP | 2013-24982 A | 2/2013 | |
| JP | 2013-64798 A | 4/2013 | |
| JP | 2013249358 A | * 12/2013 | ............. C09B 43/00 |

(Continued)

OTHER PUBLICATIONS

International Search Report and Written Opinion mailed Mar. 17, 2020 in corresponding PCT application No. PCT/JP2019/049405.
Hosoda, Senryo Kagaku (Dye Chemistry); Gihodo Publishing Co., Ltd., 1957, p. 621.
Sekar et al., "Diazo acid dyes with 3-amino-4-methoxy acetanilide and 1-naphthylamine components", Colourage, vol. 5212, pp. 119-134, 2005.
European communication dated Oct. 12, 2022 in corresponding European patent application No. 19904984.2.
Chinese communication, with English translation, dated Dec. 26, 2022 in corresponding Chinese patent application No. 201980085415.4.

*Primary Examiner* — Bijan Ahvazi
(74) *Attorney, Agent, or Firm* — NIELDS, LEMACK & FRAME, LLC

(57) ABSTRACT

An azo compound represented by the following formula (1) or a salt thereof, Wherein
$A^1$ represents a naphthyl group which may have a substituent;
$A^2$, $A^3$, and $A^4$ each independently represent a phenyl group which may have a substituent or a naphthyl group which may have a substituent;
$R^1$ represents a hydrogen atom, a hydroxy group, a C1-4 alkoxy group, or a substituted or unsubstituted amino group;
m represents an integer of 0 to 5;
M represents a hydrogen atom or ion, a metal ion, or an ammonium ion;
n represents 1 or 2;
k represents 0 or 1; and
each hydrogen atom on ring a and ring b may be substituted with the substituent $R^1$ or substituent $SO_3M$.

(1)

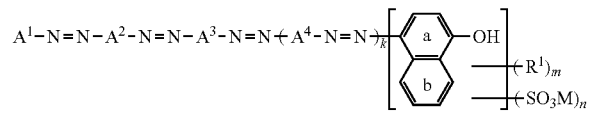

14 Claims, No Drawings

(56) References Cited

FOREIGN PATENT DOCUMENTS

| | | | |
|---|---|---|---|
| JP | 2016-148871 A | 8/2016 | |
| JP | 2020-15797 A | 1/2020 | |
| JP | 2020015797 A * | 1/2020 | ........... H01H 13/702 |
| WO | 2005/108502 A | 11/2005 | |
| WO | 2006/132327 A1 | 12/2006 | |
| WO | 2013/035560 A1 | 3/2013 | |
| WO | 2015/087709 A1 | 6/2015 | |

* cited by examiner

AZO COMPOUND OR SALT THEREOF, AND DYE-BASED POLARIZING FILM AND DYE-BASED POLARIZING PLATE CONTAINING SAME

TECHNICAL FIELD

The present invention relates to a novel azo compound or a salt thereof, and a dye polarizing film containing the same.

BACKGROUND ART

Polarizing plates having light transmitting and shielding functions are used for displays such as liquid crystal displays (LCD) together with liquid crystals having the light switching function. The application field of the LCD also is expanding from small devices such as electronic calculators and watches and clocks on the early market to laptop computers, word processors, liquid crystal projectors, liquid crystal televisions, car navigations, indoor and outdoor information displays, measuring instruments, and the like. The polarizing plates can further also be applied to lenses having the polarizing function, and are applied to sunglasses having improved visibility, and in recent years, to polarizing eyeglasses compatible with 3D televisions and the like. There are further made, not only display applications, but also applications for improving the accuracy in devices for authenticity judgment and applications for improving the S/N ratio by reflected light cutting in image sensors such as CCD and CMOS.

Usual polarizing plates are produced by making a polarizing film base material, such as a stretch-oriented film of a polyvinyl alcohol or a derivative thereof, or a polyenic film made by dehydrochlorinating a polyvinyl chloride film or dehydrating a polyvinyl alcohol film to produce polyene and orienting the resultant, to be dyed with or contain iodine or a dichroic dye as a polarizing element. Among these, iodine polarizing films using iodine as a polarizing element, though being excellent in the polarizing performance, are weak in water and heat, and pose a problem of the durability in the case of being used for a long time in a high-temperature and high-humidity state. On the other hand, dye polarizing films using a dichroic dye as a polarizing element, though being excellent in moisture resistance and heat resistance as compared with the iodine polarizing films, are generally insufficient in the polarizing performance.

In recent years, in applications to recognizing light sources for touch panels, security cameras, sensors, forgery prevention, communication devices and the like, there are demanded not only polarizing plates for the visible light wavelength region (visible region) but also polarizing plates used for the infrared light wavelength region (infrared region). For such demands, there are reported an infrared polarizing plate made by polyenization of an iodine polarizing plate as in Patent Document 1, an infrared polarizing plate to which a wire grid is applied as in Patent Document 2 or 3, an infrared polarizer made by drawing a glass containing microparticles as in Patent Document 4, and a type using a cholesteric liquid crystal as in Patent Document 5 or 6. The infrared polarizer in Patent Document 1 are poor in the durability and poor in the heat resistance, the wet heat durability and the light resistance, ending in not having practicability. The wire grid type as in Patent Document 2 or 3 can also be processed into a film type and comes into wide use because of being stable as a product. However, since the optical properties cannot be retained without nano-level unevenness on the surface, the surface is not allowed to be touched; hence, applications using it are restricted and further, the reflection prevention and the antiglare processing are difficult. The drawn glass type containing microparticles as in Patent Document 4 results in having practicability due to that the type has high durability and has high dichroism. However, the drawn glass type, since being a glass drawn with microparticles being contained, has such problematic points that the element itself is liable to be broken, and due to not having flexibility conventional polarizing plates have, the surface processing thereof and the lamination thereof with another substrate are difficult. Although the technology of Patent Document 5 and Patent Document 6 is a long-disclosed technology using circularly polarized light, since in the technology, the color varies depending on the viewing angle and the technology is basically a polarizing plate utilizing reflection, in the technology, stray light is generated and the formation of absolutely polarized light has been difficult. That is, there was no polarizing plate provided for the infrared region which is an absorption-type polarizing element like usual iodine polarizing plates, is of a film type, has flexibility and has high durability. This is caused by that the dichroic dye used in these exhibits absorption only in the visible region and no absorption in the infrared region.

Pigments and dyes exhibiting absorption in the infrared region include diimonium pigments, naphthalocyanine pigments and cyanine pigments, but these pigments are weak in durability and there are very few ones giving dichroism. Then, with regard to azo dyes, though being high in the durability, there are very few ones exhibiting absorption in the infrared region. As a dye exhibiting absorption up to the infrared region among azo dyes, there is, for example, a dye described in JP Japanese Patent No. 4244243. However, there is no description on dichroism; and in Examples, an N,N-dimethylformamide (hereinafter, also abbreviated to DMF) medium and the like are used and the description does not disclose the solubility in water and the absorption of near infrared light in an aqueous medium, which are important for the application to polarizing plates.

In particular, it is known that the absorption wavelength differs between in an aqueous medium and other media in usual water-soluble azo dyes, and for example, in JP 2007-84803 A, a compound (I-1) has the maximum absorption wavelength at 406 nm in an aqueous solution, but exhibits that at 440 nm in a polyvinyl alcohol film, and it is known that the absorption wavelength varies depending on the medium. That is, it is known that the absorption wavelength given by a dissolved or dispersed state in a medium differs from that given by a state exhibiting dichroism, that is, a state performing a polarizing function. From this fact, in water-soluble azo compounds, there is demanded a dye exhibiting absorption up to the infrared region in water or in a hydrophilic polymer, which is important as an application to polarizing plates.

PRIOR ART DOCUMENTS

Patent Document

Patent Document 1: U.S. Pat. No. 2,494,686
Patent Document 2: JP 2016-148871 A
Patent Document 3: JP 2013-24982 A
Patent Document 4: JP 2004-86100 A
Patent Document 5: WO2015/087709A Patent Document 6: JP 2013-64798 A
Patent Document 7: JP 02-167791 A
Patent Document 8: WO2013/035560A
Patent Document 9: JP 63-33477 A Non-Patent Document Non-Patent Document 1: "Senryou Kagaku" (Dye Chemistry in Japanese), Yutaka Hosoda, Gihodo Co., Ltd., 1957, p. 621

SUMMARY OF INVENTION

Problem to be Solved by the Invention

One object of the present invention is to provide a novel azo compound. Another object of the present invention is to provide a novel dichroic dye azo compound and a polarizing film comprising the same. Yet another object of the present invention is to provide a water-soluble dichroic dye azo compound exhibiting absorption in the infrared region, and a polarizing film comprising the same and exhibiting a polarizing function on infrared light.

Means to Solve the Problem

As a result of exhaustive studies to achieve such objects, the present inventors have found a novel azo compound. It has further been found novelly that by orienting the azo compound in a film comprising the azo compound, the film can function as a polarizing plate. Further in one aspect of the present invention, it has been found that the polarizing plate comprising the novel azo compound exhibiting absorption in the infrared region can function to infrared light.

That is, the present invention relates to the following.

[Invention 1]

An azo compound represented by the following formula (1) or a salt thereof:

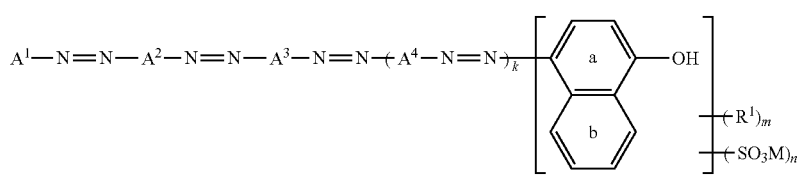

wherein $A^1$ represents a naphthyl group which may have a substituent:

$A^2$, $A^3$ and $A^4$ each independently represent a phenyl group which may have a substituent or a naphthyl group which may have a substituent;

$R^1$ represents a hydrogen atom, a hydroxy group, a C1-4 alkoxy group or a substituted or unsubstituted amino group:

m represents an integer of 0 to 5;

M represents a hydrogen atom or ion, a metal ion or an ammonium ion;

n represents 1 or 2;

k represents 0 or 1; and each hydrogen atom on ring a and ring b may be substituted with a substituent $R^1$ or a substituent $SO_3M$.

[Invention 2]

The azo compound or a salt thereof according to Invention 1, wherein $A^1$ in the above formula (1) represents a naphthyl group having one or more substituents selected from the group consisting of a hydroxy group, a C1-4 alkoxy group having a sulfo group, and a sulfo group.

[Invention 3]

The azo compound or a salt thereof according to Invention 1 or 2, wherein $A^2$, $A^3$ and $A^4$ in the above formula (1) are each independently represented by the following formula (2) or formula (3), and at least one of $A^2$, $A^3$ and $A^4$ is represented by the formula (2):

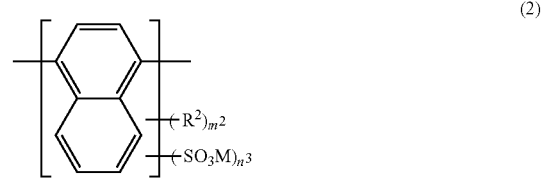

wherein $R^2$ represents a hydrogen atom, a hydroxy group, a C1-4 aliphatic hydrocarbon group, a C1-4 alkoxy group, a substituted or unsubstituted amino group, or a C1-4 alkoxy group having a sulfo group:

$m^2$ represents an integer of 0 to 6;

M represents a hydrogen atom or ion, a metal ion or an ammonium ion; and $n^3$ represents an integer of 0 to 2, and

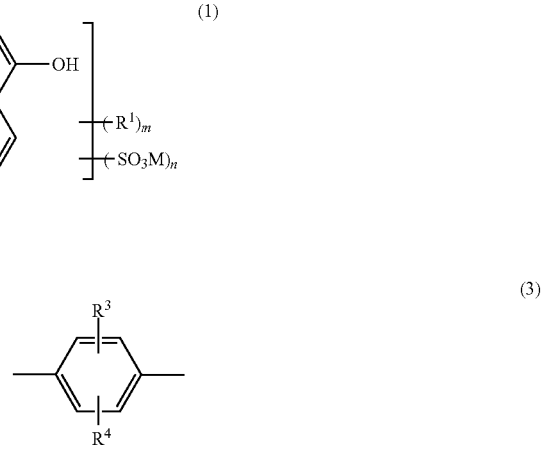

wherein $R^3$ and $R^4$ each independently represent a hydrogen atom, a C1-4 aliphatic hydrocarbon group, a C1-4 alkoxy group, a C1-4 alkoxy group having a hydroxy group, or a C1-4 alkoxy group having a sulfo group.

[Invention 4]

The azo compound or a salt thereof according to any of Inventions 1 to 3, wherein $A^1$ in the above formula (1) is represented by the following formula (4):

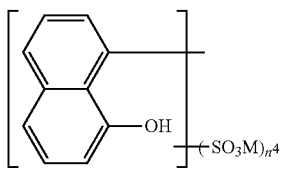

(4)

wherein $n^4$ represents 1 or 2.

[Invention 5]

The azo compound or a salt thereof according to any of Inventions 1 to 4, wherein the above formula (1) is represented by the following formula (5):

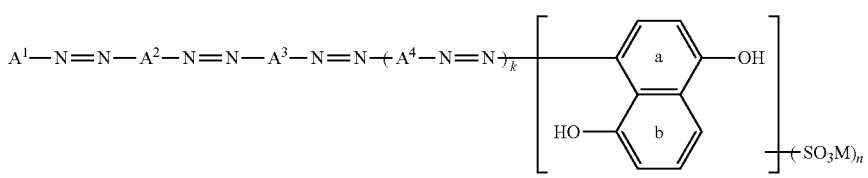

(5)

wherein $A^1$, $A^2$, $A^3$, $A^4$, M, n and k are each the same as in the above formula (1); and each hydrogen atom on ring a and ring b may be substituted with a substituent $SO_3M$.

[Invention 6]

The azo compound or a salt thereof according to Invention 1, wherein the above formula (1) is represented by the following formula (6):

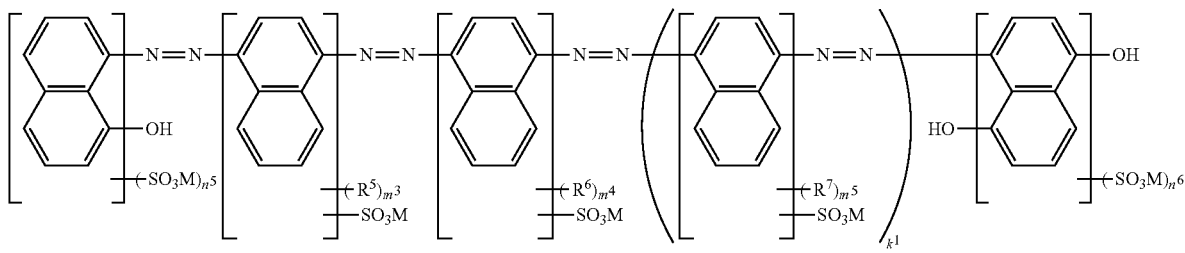

(6)

wherein $R^5$, $R^6$ and $R^7$ each independently represent a hydrogen atom, a hydroxy group, a C1-4 alkoxy group or a substituted or unsubstituted amino group;

$m^3$ to $m^5$ each independently represent an integer of 0 to 5;

M represents a hydrogen atom or ion, a metal ion or an ammonium ion;

$n^5$ and $n^6$ each independently represent 1 or 2; and $k^1$ represents 0 or 1.

[Invention 7]

A polarizing film comprising at least one azo compound or a salt thereof according to any of Inventions 1 to 6.

[Invention 8]

The polarizing film according to Invention 7, wherein at least one of wavelengths at which the absorbance ratio Rd ($=A_H/A_L$) of an absorbance ($A_H$) on an axis giving the lowest transmittance of polarized light to an absorbance ($A_L$) on an axis giving the highest transmittance of the polarized light indicates a value of 5 or higher is in 700 to 1,500 nm.

[Invention 9]

The polarizing film according to Invention 7 or 8, comprising the azo compound or a salt thereof according to any of Inventions 1 to 6, and one or more organic dyes other than the azo compound or the salt thereof

[Invention 10]

The polarizing film according to any of Inventions 7 to 9, wherein the polarizing film exhibits neutral gray.

[Invention 11]

The polarizing film according to any of Inventions 7 to 10, using a film comprising a polyvinyl alcohol resin or a derivative thereof as a base material.

[Invention 12]

A polarizing plate, comprising a transparent protection layer on at least one surface of the polarizing film according to any of Inventions 7 to 11.

[Invention 13]

A display comprising a polarizing film according to any of Inventions 7 to 11 or a polarizing plate according to Invention 12.

[Invention 14]

The display according to Invention 13, wherein the display is used for vehicular usage or outdoor display usage.

Advantageous Effects of Invention

The azo compound or a salt thereof of the present invention is useful as a dye for a polarizing film. In one aspect, the azo compound or a salt thereof of the present invention is water-soluble. In one aspect, the azo compound or a salt thereof of the present invention is dichroic. In one aspect, the polarizing film or the polarizing plate of the present invention exhibits absorption in the infrared region, and can be handled similarly to conventional polarizing films or polarizing plates for rays in the infrared region. In one aspect, the polarizing film or the polarizing plate of the present invention is flexible. In one aspect, the polarizing film or the polarizing plate of the present invention is physically stable.

In one aspect, the polarizing film or the polarizing plate of the present invention, since being an absorption-type polarizing plate, does not generate stray light. In one aspect, the polarizing film or the polarizing plate of the present invention has high weather resistance (at least one of heat resistance, wet heat resistance and light resistance).

EMBODIMENTS FOR CARRYING OUT THE INVENTION

The present invention relates to a novel azo compound or a salt thereof, and has an object to cause a film to develop absorption having anisotropy by dyeing the film with the dye and stretching and thereby orienting the film. The infrared region refers generally to 700 to 30000 nm, but a polarizing film comprising a compound obtained in the present invention functions as a polarizing film for near-infrared rays, the wavelength of which refers to 700 to 1,500 nm, and becomes a polarizing film performing the polarizing function in the wavelength.

<The Azo Compound or a Salt Thereof>

The azo compounds or salts thereof of the present invention are represented by the formula (1).

In the above formula (1), $A^1$ represents a naphthyl group which may have a substituent; $A^2$, $A^3$ and $A^4$ each independently represent a phenyl group which may have a substituent or a naphthyl group which may have a substituent; $R^1$ represents a hydrogen atom, a hydroxy group, a (C1-4) alkoxy group having 1 to 4 carbon atoms, or a substituted or unsubstituted amino group; m represents an integer of 0 to 5; M represents a hydrogen atom or ion, a metal ion or an ammonium ion; n represents 1 or 2; k represents 0 or 1; and each hydrogen atom on ring a and ring b may be substituted with a substituent $R^1$ or a substituent $SO_3M$.

The substituent of the naphthyl group which may have a substituent in the above $A^1$ is not especially limited, but examples thereof include C1-4 aliphatic hydrocarbon groups which may have a substituent, C1-4 alkoxy groups which may have a substituent, C1-4 alkoxy groups which may have a sulfo group, aryloxy groups which may have a substituent, a hydroxy group, a sulfo group, a carboxy group, a nitro group, and a substituted or unsubstituted amino group and an amide group; and preferable are substituents selected from the group consisting of C1-4 alkoxy groups which may have a substituent, a sulfo group, a nitro group and a carboxy group.

Examples of the above C1-4 aliphatic hydrocarbon groups which may have a substituent include straight-chain aliphatic hydrocarbon groups such as a methyl group, an ethyl group, an n-propyl group and an n-butyl group, branched-chain aliphatic hydrocarbon groups such as an isopropyl group, a sec-butyl group and a tert-butyl group, and alicyclic hydrocarbon groups such as a cyclobutyl group.

Examples of the above C1-4 alkoxy groups which may have a substituent include a methoxy group, an ethoxy group, an n-propoxy group, an n-butoxy group, an isopropoxy group, a sec-butoxy group, a tert-butoxy group and a cyclobutoxy group.

Examples of the above C1-4 alkoxy groups which may have a sulfo group include a sulfomethoxy group, a sulfoethoxy group, a 3-sulfopropoxy group, a 4-sulfobutoxy group and a 3-sulfobutoxy group.

Examples of the above aryloxy groups which may have a substituent include a phenoxy group and a naphthoxy group.

Examples of the above substituted or unsubstituted amino groups include mono-substituted amino groups such as an amino group, a methylamino group, an ethylamino group, an n-propylamino group, an n-butylamino group, a monophenyl amino group and a mononaphthyl amino group, and di-substituted amino groups such as a dimethylamino group, a diethylamino group, a diphenylamino group, an N-ethyl-N-methylamino group and an N-ethyl-N-phenylamino group. These substituted amino groups may further have a substituent.

"Substituents" in the above C1-4 aliphatic hydrocarbon groups which may have a substituent and C1-4 alkoxy groups which may have a substituent are not especially limited, and examples thereof include a hydroxy group, a sulfo group, a carboxy group and the above substituted or unsubstituted amino group and an amide group.

"Substituents" in the above aryloxy groups which may have a substituent and "substituents" the substituted amino groups may further have are not especially limited, and examples thereof include C1-4 aliphatic hydrocarbon groups which may have a substituent.

The substituent in the naphthyl group which may have a substituent in the above $A^1$ is preferably a substituent selected from the group consisting of a hydroxy group, C1-4 alkoxy groups having a sulfo group, and a sulfo group, and more preferably a sulfo group or a hydroxy group. Such a form of the naphthyl group is more preferable that in the case where the substitution position of an azo group is taken as 1-position, the counterclockwise 8-position is substituted by a hydroxy group; and a naphthyl group represented by the above formula (4) is especially preferable in which any position(s) is substituted further by a sulfo group(s).

$A^2$, $A^3$ and $A^4$ in the above formula (1) each independently represent a phenyl group which may have a substituent or a naphthyl group which may have a substituent. The substituent in the phenyl group which may have a substituent or the naphthyl group which may have a substituent is not especially limited, and may be the same substituent as in the above C1-4 aliphatic hydrocarbon groups which may have a substituent. As described later, it is preferable that $A^2$, $A^3$ and $A^4$ are each independently represented by the above formula (2) or (3), and at least one of $A^2$, $A^3$ and $A^4$ is represented by the formula (2).

$R^1$ in the above formula (1) represents a hydrogen atom, a hydroxy group, a C1-4 alkoxy group or a substituted or unsubstituted amino group. $R^1$ is preferably a hydrogen atom or a hydroxy group, and more preferably a hydroxy group. The substitution position of $R^1$ is, in the case where the position of the hydroxy group of the ring a is taken as 1-position, preferably the 5-position.

M in the above formula (1) represents a hydrogen atom or ion, a metal ion or an ammonium ion. Examples of the metal ion include alkaline metal ions such as a lithium ion, a sodium ion and a potassium ion, and alkaline earth metal ions such as a calcium ion and a magnesium ion. Examples of the ammonium ion include an ammonium ion, a methylammonium ion, a dimethylammonium ion, a triethylammonium ion, a tetraethylammonium ion, a tetra-n-propylammonium ion, a tetra-n-butylammonium ion and a triethanolammonium ion. More specifically, for example, in the case where M is a hydrogen atom or ion, $-SO_3M$ represents sulfonic acid ($-SO_3H$); in the case where M is a sodium ion, sodium sulfonate ($-SO_3Na$); and in the case where M is an ammonium ion, ammonium sulfonate ($-SO_3NH_4$).

Each hydrogen atom on ring a and ring b in the above formula (1) may be substituted with the above substituent ($R^1$) or the above substituent ($-SO_3M$).

It is preferable that either one or both of the ring a and the ring b in the above formula (I) are substituted with a sulfo group. It is also preferable that the ring b is substituted with a hydroxy group. Above all, in the case where the azo bonding site of the ring a is taken as 1-position, especially preferable are a case where the counterclockwise 2-position is substituted by a hydroxy group and the 3-position and the 7-position are each substituted by a sulfo group, a case where the 4-position is substituted by a sulfo group, a case where the 2-position is substituted by a hydroxy group, and the 4-position is substituted by a sulfo group, and a case where the 7-position is substituted by a sulfo group.

It is preferable that $A^2$, $A^3$ and $A^4$ in the (1) are each independently represented by the above formula (2) or formula (3), and at least one of $A^2$, $A^3$ and $A^4$ is represented by the formula (2), because a broad band polarizing element is obtained, In the above formula (2), $R^2$ represents a hydrogen atom, a hydroxy group, a C1-4 aliphatic hydrocarbon group, a C1-4 alkoxy group, a substituted or unsubstituted amino group, or a C1-4 alkoxy group having a sulfo group; $m^2$ represents an integer of 0 to 6; M represents a hydrogen atom or ion, a metal ion or an ammonium ion; and $n^3$ represents an integer of 0 to 2, and the C1-4 aliphatic hydrocarbon group, the C1-4 alkoxy group, the substituted or unsubstituted amino group, the C1-4 alkoxy group having a sulfo group, and M each may be the same as in the above.

In the above formula (2), $m^2$ represents preferably an integer of 0 to 4, more preferably an integer of 0 to 2 and especially preferably 0 or 1. $R^2$ preferably represents a hydrogen atom or a hydroxy group. $n^3$ represents preferably 0 or 1 and more preferably 1. The substitution position of $R^2$ is, in the case where the azo group on the $A^1$ side is taken as 1-position, preferably the 2-position, the 3-position or the 5-position. Especially preferably, the 2-position or the 3-position is substituted by a hydrogen atom or a methoxy group; and especially preferably the 3-position. It is preferable that the 8-position is substituted by a hydrogen atom or a hydroxy group, and it is especially preferable that the 8-position is substituted by a hydroxy group. It is preferable that in the above formula (1), $A^3$ and $A^4$ have a structure represented by the formula (2), because the azo compound of the present invention becomes a pigment for obtaining a polarizing film which is for a broad band and is high in the degree of polarization. Specifically, it is especially preferable that when k=0, $A^3$ has a structure of the formula (2), and when k=1, $A^4$ has a structure of the formula (2).

In the above formula (3). $R^3$ and $R^4$ each independently represent a hydrogen atom, a C1-4 aliphatic hydrocarbon group, a C1-4 alkoxy group, a C1-4 alkoxy group having a hydroxy group, or a C1-4 alkoxy group having a sulfo group; and the C1-4 aliphatic hydrocarbon group, the C1-4 alkoxy group, the C1-4 alkoxy group having a hydroxy group, and the C1-4 alkoxy group having a sulfo group each may be the same as in the above.

In the above formula (1), when $A^3$ and $A^4$ have a structure represented by the formula (3), it is preferable that $R^3$ and $R^4$ each independently represent a hydrogen atom or a C1-4 alkoxy group, because the azo compound of the present invention becomes a pigment for obtaining a polarizing film which is for a broad band and is high in the degree of polarization; more preferably, $R^3$ and $R^4$ each independently represent a methoxy group or an ethoxy group; and especially preferably, a methoxy group. Specifically, it is preferable that when k=0 and $A^3$ has a structure of the formula (3), $R^3$ and $R^4$ represent a methoxy group; and it is especially preferable that when k=1 and $A^4$ has a structure of the formula (3), $R^3$ and $R^4$ represent a methoxy group.

It is preferable that the above formula (1) is represented by the above formula (5). In the above formula (5), $A^1$ to $A^4$, M, n, k, the ring a and the ring b each may be the same as in the above formula (1). It is preferable that the above formula (I) is represented by the above formula (5), because there can be obtained a near infrared polarizing film which is for a broader band and is higher in the degree of polarization.

It is also preferable that the above formula (1) is represented by the above formula (6). In the above formula (6), $R^5$, $R^6$ and $R^7$ each independently represent a hydrogen atom, a hydroxy group, a C1-4 alkoxy group or a substituted or unsubstituted amino group; and $m^3$ to $m^5$ each represent an integer of 0 to 5. M represents a hydrogen atom or ion, a metal ion or an ammonium ion; and $n^5$ and $n^6$ each independently represent 1 or 2. $k^1$ may be the same as k in the above formula (1). The C1-4 alkoxy group and the substituted or unsubstituted amino group each may be the same as in the above. It is preferable that the above formula (1) is represented by the above formula (6), because there can be obtained a near infrared polarizing film which is for a broader band and is higher in the degree of polarization.

Then, specific examples of an azo compound represented by the above formula (1) or a salt thereof include the following. Here, a sulfo group, a carboxy group and a hydroxy group in formulae are expressed in free acid forms.

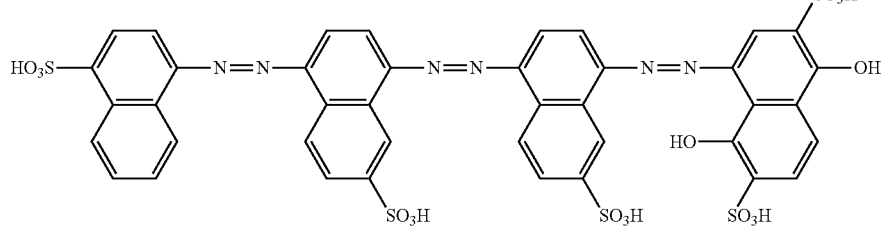

(7)

-continued
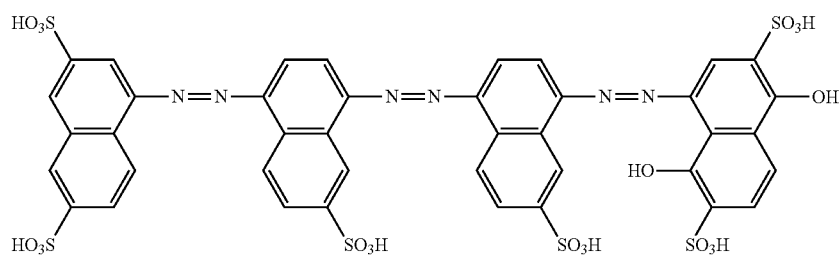
(8)
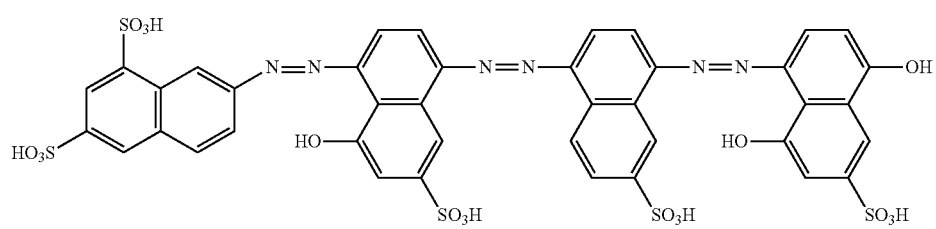
(9)
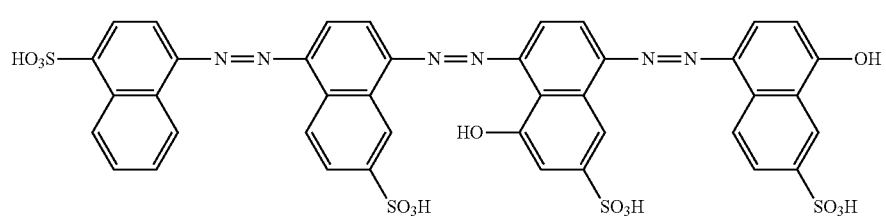
(10)
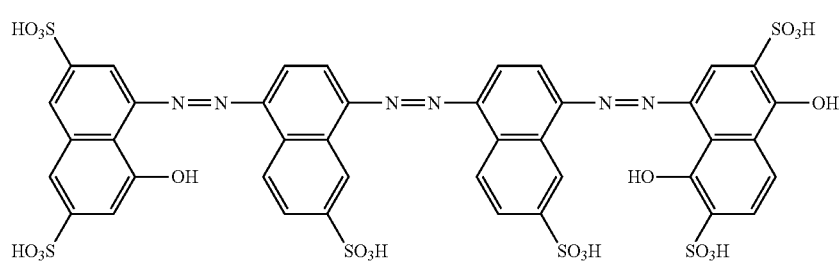
(11)
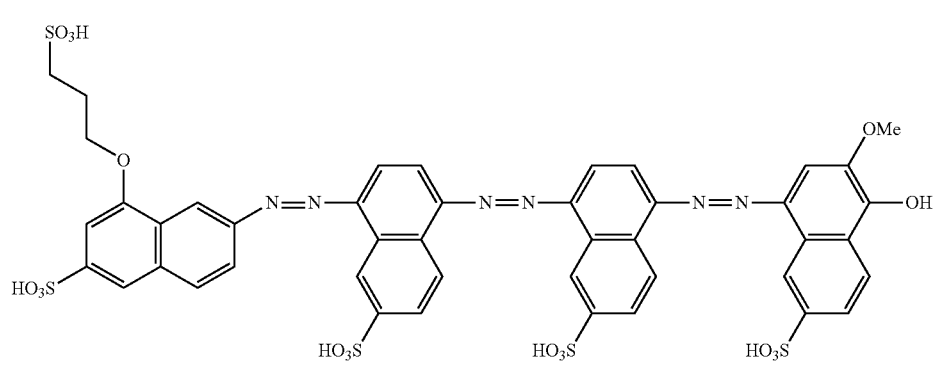
(12)
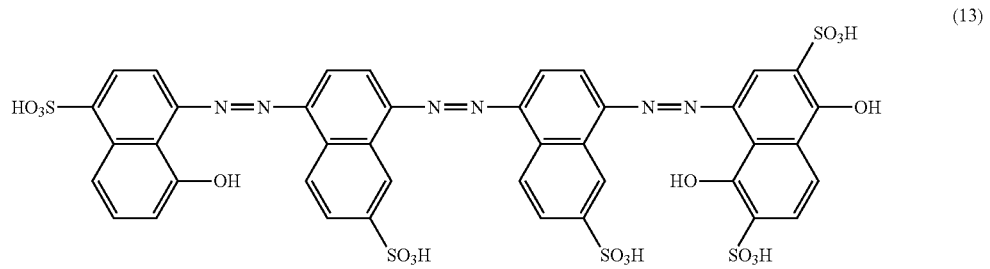
(13)

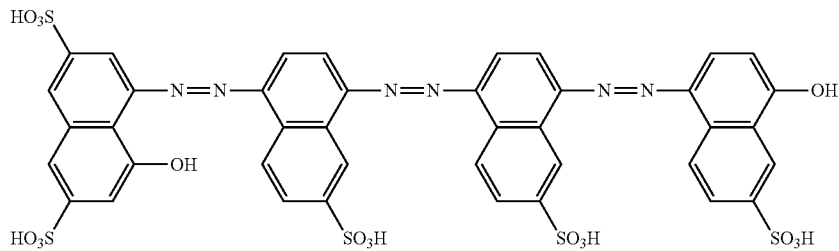
(14)
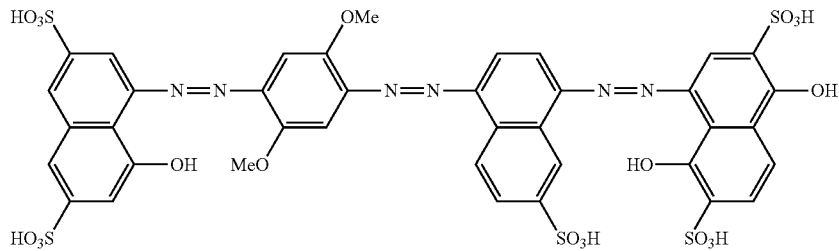
(15)
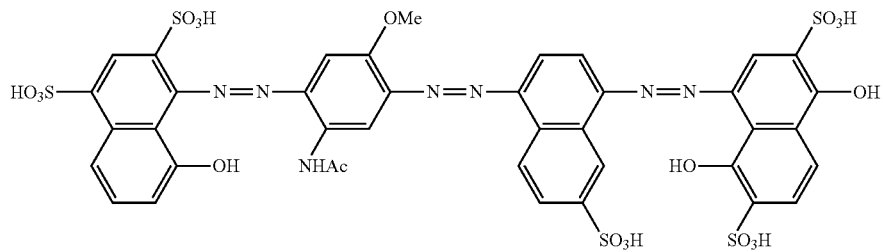
(16)
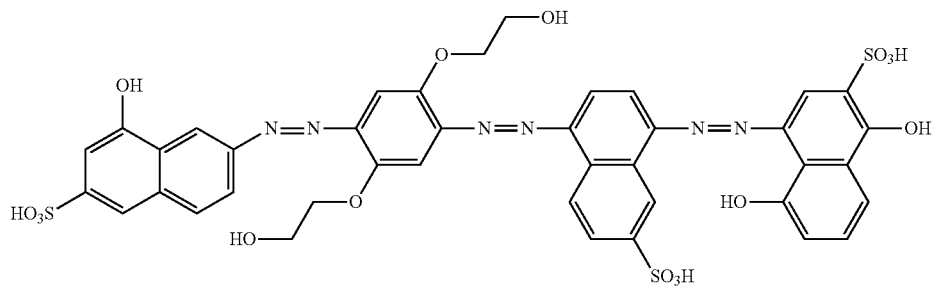
(17)
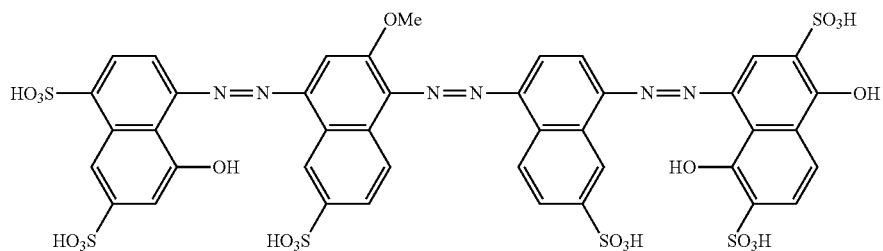
(18)
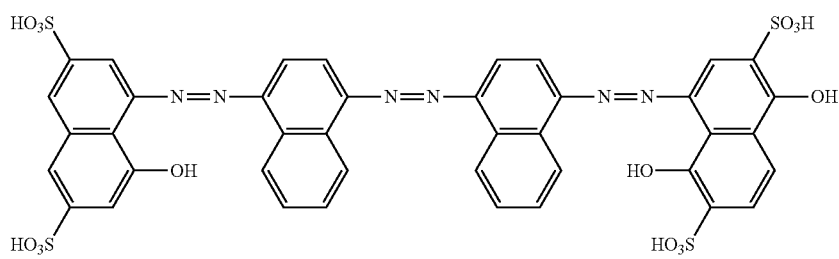
(19)

-continued
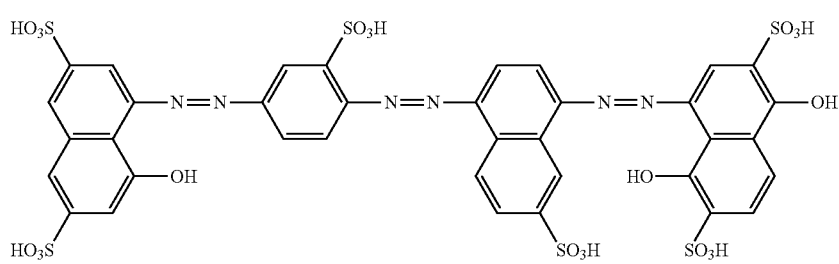
(20)
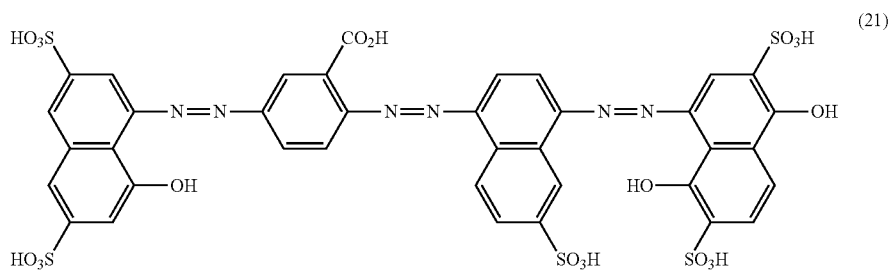
(21)
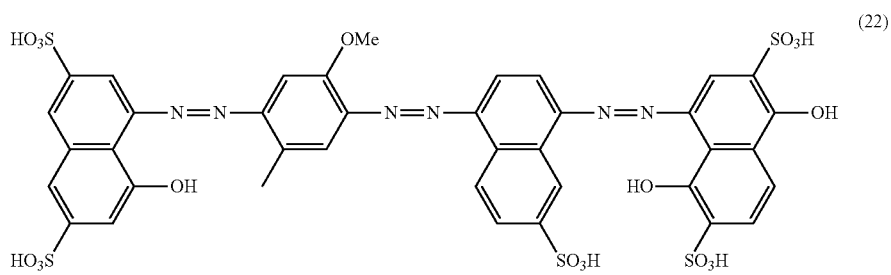
(22)
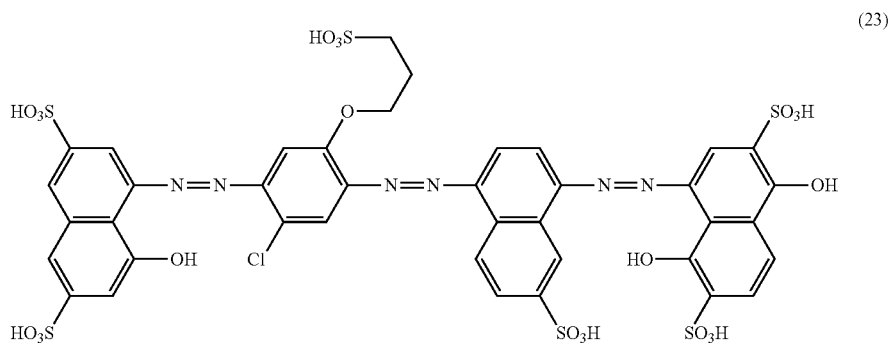
(23)
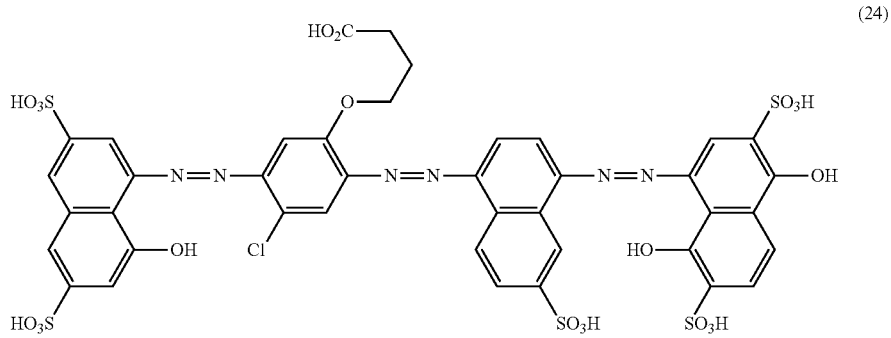
(24)

-continued

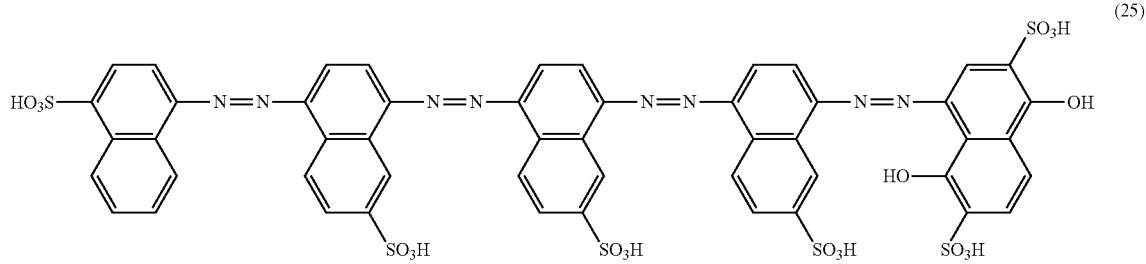
(25)

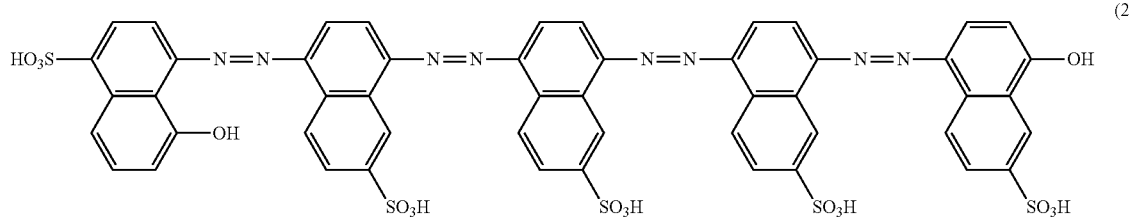
(26)

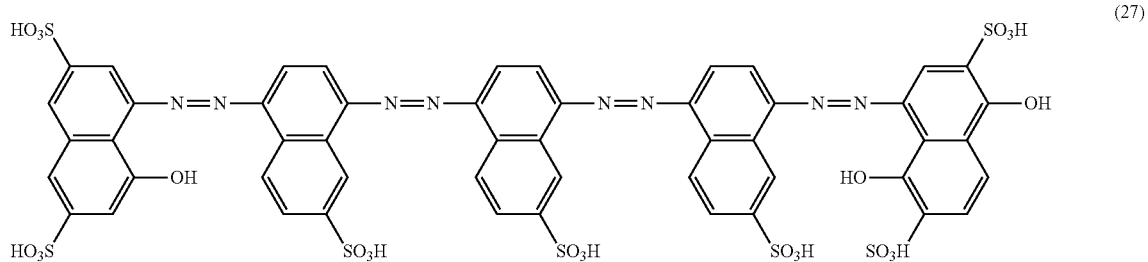
(27)

The azo compounds represented by the above formulae (1), (5) and (6) and salts thereof can be produced, for example, by carrying out diaotization and coupling according to usual production methods of azo dyes as in Patent Document 3 and Non Patent Document 1.

As a specific example of the production methods, a production method in the case of k=0 in the above formula (5) will be described below.

The following formula (A) being an aminonaphthalene is diazotized and primarily coupled with an aminonaphthalene or an aniline represented by the following formula (B) to thereby obtain a monoazoamino compound represented by the following formula (C). The monoazoamino compound (C) is diazotized and secondarily coupled with an aminonaphthalene or an aniline represented by the following (D) to thereby obtain a disazoamino compound represented by the following (E). The disazoamino compound (E) is diazotized and tertiarily coupled with a naphthol represented by the following formula (F) to thereby obtain an azo compound represented by the above formula (5).

$A^1-NH_2$ (A)

$A^2-NH_2$ (B)

$A^1-N=N-A_2-NH_2$ (C)

$A^3-NH_2$ (D)

$A^1-N=N-A_2-N=N-A_3-NH_2$ (E)

-continued

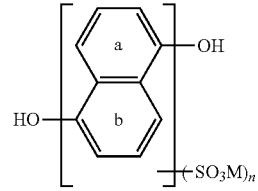
(F)

In the above production method, it is preferable that the diazotization steps are carried out according to an ordinary method in which a mineral acid (hydrochloric acid, sulfuric acid or the like) aqueous solution or suspension liquid of the diazo component is mixed with a nitrite salt such as sodium nitrite, or a reverse method in which a nitrite salt is added to a neutral or weak alkaline aqueous solution of the diazo component and then, mixed with the mineral acid. The temperature of the diazotization is suitably −10 to 40° C. Then, it is preferable that the steps of coupling with an aniline are carried out by mixing an acidic aqueous solution of hydrochloric acid, acetic acid or the like with the above each diazo liquid and at a temperature of −10 to 40° C. under an acidic condition of a pH of 2 to 7.

The azo compounds of the above formulae (C) and (E) obtained by coupling are filtered as they are, or deposited by acid precipitation or salting out and filtered and taken out, or can also be progressed to the next step as they are solutions or suspension liquids. In the case where a diazonium salt is poorly soluble and a suspension liquid, the diazonium salt is filtered and can also be used as a press cake in the following coupling steps.

It is preferable that the tertiary coupling reaction of a diazotized substance of the disazoamino compound of the above formula (E) with the naphthol represented by the above formula (F) is carried out at a temperature of −10 to 40° C. under neutral to alkaline conditions of a pH of 7 to 10. After the finish of the reaction, the obtained azo compound of the formula (5) or salt thereof is preferably deposited by salting out and filtered and taken out. Then in the case where purification is necessary, salting out may be repeated, or the azo compound may be deposited from in water by using an organic solvent. Examples of the organic solvent to be used for the purification include water-soluble organic solvents including alcohols such as methanol or ethanol and ketones such as acetone.

The azo compound or a salt thereof according to the present invention is useful as a dye for a polarizing film. According to the azo compound or a salt thereof according to the present invention, there can be produced a high-performance dye near infrared polarizing plate having the polarizing performance in the near infrared region and having moisture resistance, heat resistance and light resistance. Further by concurrently using a dye having the polarizing performance in the visible region, there can be materialized a neutral gray high-performance dye polarizing plate which can control not only the visible region as heretofore but also up to the near infrared region. Accordingly, the azo compound or a salt thereof according to the present invention is suitable for production of neutral gray polarizing plates for vehicular usage or outdoor display usage to be used under the high-temperature and high-humidity condition, and for various types of sensors necessitating control the near infrared region.

<Dye Polarizing Film>

The polarizing function is sometimes indicated usually by the difference in the transmittance or the degree of polarization or the dichroic ratio calculated from the ratio in light absorption (absorbance ratio) on different axes. One index of having a polarizing function in the present application includes having a degree of polarization, and one preferable form of the present application include a polarizing film in which at least one of wavelengths is in 700 to 1,500 nm as the wavelengths at which the absorbance ratio of an absorbance on an axis giving the lowest transmittance of polarized light in transmittances in polarized light incidence to an absorbance on an axis giving the highest transmittance of the polarized light therein indicates a value of 5 or higher. The absorbance ratio is generally called the dichroic ratio, and the dichroic ratio having 5 or more indicates having general absorption anisotropy, that is, a polarizing function. The dichroic ratio is preferably a higher one, more preferably 10 or higher and still more preferably 20 or higher. With the dichroic ratio being lower than 5, although an absorption anisotropy is surely exhibited, usage applications as the absorption anisotropy, that is, usage applications as the polarizing function becomes remarkably few. Further it is more preferable that the wavelength at which the dichroic ratio indicates the highest value is in 700 to 1,500 nm, but this may necessarily not be the case; it is a feature of the present application that a polarizing film has an absorption anisotropy having a dichroic ratio of 5 or higher in 700 to 1,500 nm, that is, a polarizing function, by using a compound represented by the formula (1); and it is also an unprecedented feature that there can be obtained a polarizing film having a dichroic ratio of as high as 10 or higher in 700 to 1,500 nm. Specifically, when the single transmittance is 30%, a dichroic ratio of 5 means giving a degree of polarization of 88.2%, that is, about 90%; and a dichroic ratio of 10, giving a degree of polarization of 98.3%, that is, about 99%.

The dye polarizing film of the present invention comprises a dichroic pigment comprising at least an azo compound represented by the formula (1) or a salt thereof, and a polarizing film base material. The dye polarizing film of the present invention can also be made as a color polarizing film functioning as a near infrared polarizing film and simultaneously functioning also in the visible region. In particular, a polarizing film can be produced which has a hue of neutral gray in the visible region. Here, the "neutral gray" means that in the state that two sheets of polarizing film are superposed so orientation directions thereof as to orthogonally intersect each other, light leakage (color leakage) of specific wavelengths in the visible region and the near infrared region is low. Specifically, in particular, for the hue to become neutral gray, in the state that two sheets of polarizing film are superposed so orientation directions thereof as to orthogonally intersect each other, the transmittance is 3% or lower, preferably 1% or lower, more preferably 0.3% or lower, still more preferably 0.1% or lower and especially preferably 0.05% or lower, individually at each absorption wavelength of 460 nm, 550 nm and 610 nm, preferably simultaneously; at this time, in wavelengths in the near infrared region, for example, at 850 nm and 950 nm, the transmittance is 3% or lower, preferably 1% or lower, more preferably 0.3% or lower, still more preferably 0.1% or lower and especially preferably 0.05% or lower. Since 460 nm, 550 nm and 610 nm are wavelengths largely affecting the visibility and are wavelengths giving high sensitivity to blue, green and red, controlling the transmittances of absorption wavelengths of 460 nm, 550 nm and 610 nm is needed in order to make the neutral gray; and simultaneously, it is preferable that also the transmittance in the infrared region can be controlled to a transmittance in the similar level.

The dye polarizing film of the present invention comprises, as a dichroic pigment, an azo compound represented by the formula (1) or a salt thereof singly or in plural kinds thereof, and as required, can further comprise one or more kinds of organic dyes other than the azo compound or the salt thereof. The other organic dyes to be concurrently used are not especially limited, but are preferably dyes having dichroism in a wavelength region different from the absorption wavelength region of the azo compound represented by the formula (1) or a salt thereof, wherein the dichroism is high. Representative examples of organic dyes to be concurrently used include dyes such as C.I. Direct Yellow 12, C.I. Direct Yellow 28, C.I. Direct Yellow 44, C.I. Direct Orange 26, C.I. Direct Orange 39, C.I. Direct Orange 71, C.I. Direct Orange 107, C.I. Direct Red 2, C.I. Direct Red 31, C.I. Direct Red 79, C.I. Direct Red 81, C.I. Direct Red 247, C.I. Direct Blue 69, C.I. Direct Blue 78, C.I. Direct Blue 247, C.I. Direct Green 80 and C.I. Direct Green 59. These dyes are contained as free acids or alkaline metal salts (for example, Na salts, K salts or Li salts), ammonium salts or amine salts in the dye polarizing film.

In the case of concurrently using the azo compound represented by the formula (1) or a salt thereof and the other organic dyes, kinds of the other organic dyes to be blended differ depending on whether the hue in the visible region of a targeted dye polarizing film is that of a neutral gray polarizing film, that of a color polarizing film for a liquid crystal projector or that of other color polarizing films. The proportion of the other organic dyes to be blended is not especially limited, but the total of one kind or plural kinds of organic dyes is, on the basis of the mass of the azo compound of the formula (1) or a salt thereof, preferably in the range of 0.1 to 10 parts by mass.

In the case of a neutral gray polarizing film having a polarizing function in the near infrared region, the kind and the blend proportion of the other organic dyes to be concurrently used with the dye of the formula (1) are regulated so that in an obtained polarizing film, the color leakage in the visible region becomes low.

The near infrared dye polarizing film or the neutral gray dye polarizing film having a polarizing function in the near infrared region according to the present invention can be produced by making a dichroic pigment containing at least an azo compound represented by the formula (1) or a salt thereof and as required, further containing other organic dyes to be contained in a polarizing film base material (for example, polymer film) and oriented by a known method, to be mixed together with a liquid crystal, or to be oriented in a polarizing film base material by a coating method.

The polarizing film base material is a polymer film, preferably a film obtained by forming a film of a hydrophilic polymer, and more preferably a film composed of a polyvinyl alcohol resin or a derivative thereof. The hydrophilic polymer usable as the polarizing film base material is not especially limited, but refers to a film having a high affinity for water. The film refers to, for example, a film which is made to contain water or swell when the film is dipped in or brought into contact with water as a medium. Specifically, there can be used polyvinyl alcohol resins, amylose resins, starch resins, cellulose resins, polyacrylate salt resins and derivatives thereof. A film, composed of such a resin, is made to contain a dichroic pigment having absorption in the infrared region and stretched and thereby oriented to thereby obtain a polarizing plate. Taking it into consideration that a dichroic pigment is made to be contained and crosslinked, films composed of polyvinyl alcohol resins are most preferable. The films include films of a polyvinyl alcohol or a derivative thereof, and these modified with an olefin such as ethylene or propylene, an unsaturated carboxylic acid such as crotonic acid, acrylic acid, methacrylic acid or maleic acid, or the like. As the polarizing film base material, a film composed of a polyvinyl alcohol or a derivative thereof is suitably used from the viewpoint of the absorbability and the orientability of the dye. The thickness of the polarizing film base material is usually 10 to 100 μm and preferably about 25 to 80 μm.

In the case where the polarizing film base material is a polymer film, for making a dichroic pigment containing at least an azo compound represented by the formula (1) or a salt thereof to be contained, usually, a method of dyeing the polymer film can be adopted. The dyeing can be carried out, for example, as follows. First, the azo compound or a salt thereof of the present invention and, as required an organic dye other than this are dissolved in water to thereby prepare a dye bath. The concentration of the dye in the dye bath is not especially limited, but is selected from in the range of about 0.001 to 10% by mass. Then, as required, a dyeing auxiliary may be used, and for example, use of mirabilite in a concentration of about 0.1 to 10% by mass is suitable. The polymer film is dipped in the dye bath thus prepared, for example, for 1 to 10 min to carry out dyeing. The dyeing temperature is preferably about 40 to 80° C.

The orientation of the dichroic pigment containing the azo compound of the formula (1) or a salt thereof is carried out by stretching the dyed polymer film. As a stretching method, any known method, for example, a wet method or a dry method, can be used. The stretching of the polymer film, as the case may be, may be carried out before the dyeing. In this case, the orientation of the dye is carried out at the time point of the dyeing. The polymer film in which the dye is contained and oriented is, as required, subjected to a post-treatment such as a boric acid treatment by a known method. Such a post-treatment is carried out for the purpose of improving the light transmittance and the degree of polarization of the dye polarizing film. The condition of the boric acid treatment differs depending on the kind of the polymer film to be used and the kind of the dye to be used, and the condition is usually such that the polymer film is dipped and stretched in a boric acid aqueous solution whose boric acid concentration is made to be 0.1 to 10% by mass, preferably in the range of 0.5 to 7% by mass and especially preferably 1 to 5% by mass, in a temperature range of, for example, 30 to 80° C. and preferably 40 to 75° C., for example, for 0.5 to 10 min. Further as required, there may be carried out additionally a fixing treatment with an aqueous solution containing a cationic polymer compound. Here, although the polarizing film of the present invention can be obtained by stretching a polarizing film base material using the pigment of the present invention in a pH of 4 to 9 in an aqueous solution for dipping in a stretch step or a step before stretching or/and a step after stretching, it is preferable to carry out the treatment at a pH of 6 to 9 in the stretch step or the step after stretching, because there can thereby be obtained a polarizing film for a broader band and a long-wavelength near infrared region. A method of regulating the pH of the aqueous solution, particularly a boric acid aqueous solution, in the treatment to 6 to 9, preferably involves adding a basic substance such as sodium hydroxide, potassium hydroxide or borax. In the case of using a polymer film, particularly a film composed of a polyvinyl alcohol or a derivative thereof, stretching using borax is one of preferable forms. In the case of using borax, boric acid and borax may be used concurrently. Although as long as the pH in the treatment step is 6 to 9, there can be band-broadened the wavelength region having the polarizing function of a polarizing film using the pigment of the present application, the pH in one preferable form is more preferably 6.5 to 8.5 and especially preferably 6.5 to 8.0.

By affixing a protecting film on the obtained dye polarizing film, the resultant can be used as a polarizing plate, and as required, there can further be installed a protecting layer or an AR (antireflection) layer, a support and the like. Examples of applications of the dye polarizing film include applications to liquid crystal projectors, electronic calculators, watches and clocks, laptop computers, word processors, liquid crystal televisions, car navigations, indoor and outdoor measuring instruments, display devices and the like, lenses, eyeglasses, devices for authenticity judgment, and image sensors such as CCD and CMOS. The dye polarizing film has a high polarizing performance matching known polarizing films using iodine also in the near infrared region, and is excellent also in the durability. Hence, the dye polarizing film is especially suitable for various types of liquid crystal displays, liquid crystal projectors, vehicular devices, outdoor display devices (for example, applications to displays of industrial measuring instruments and wearable devices), which all necessitate a high polarizing performance and durability, and security devices necessitating high reliability, and the like.

<Dye Polarizing Plate>

The dye polarizing plate can be obtained by laminating a transparent protecting film on at least one surface of the dye polarizing film. The dye polarizing plate, since having the above dye polarizing film, has excellent polarizing performance, moisture resistance, heat resistance and light resistance. As a material for forming the transparent protecting film, materials excellent in optical transparency and mechanical strength are preferable and there are used, for examples, cellulose acetate films and acrylic films, and besides, fluorine-containing films of ethylene tetrafluoride/propylene hexafluoride copolymers or the like, and films composed of polyester resins, polyolefin resins or polyamide resins. The transparent protecting film is preferably a triacetylcellulose (TAC) film or a cycloolefinic film. The thickness of the protecting film is usually preferably 10 to 200 μm and more preferably 20 to 100 μm.

An adhesive agent usable for laminating the polarizing film and the protecting film includes polyvinyl alcoholic adhesive agents, urethane emulsion adhesive agents, acrylic adhesive agents and adhesive agents composed of a polyol and an isocyanate, and the polyvinyl alcoholic adhesive agents are suitable.

A transparent protecting layer may further be installed on the surface of the dye polarizing plate. Examples of the additional transparent protecting layer include acrylic or polysiloxane hard coat layers, and urethane protecting layers. In order to more improve the single plate light transmittance, it is preferable that an AR layer is installed on the protecting layer. The AR layer can be formed by vapor deposition or sputtering of a substance, for example, silicon dioxide or titanium oxide, or can be formed by thinly applying a fluorine-containing substance. The dye polarizing plate, by further laminating a retardation plate on the surface thereof, can also be used as a circularly polarizing plate or an elliptically polarizing plate.

The dye polarizing plate may be either the above near infrared polarizing plate or a neutral polarizing plate having a polarizing function in the near infrared region. The neutral gray polarizing plate of the present invention has such a feature that the color leakage at the orthogonal position in the visible region and in the near infrared region is low; the polarizing performance is excellent; the color change and the reduction of the polarizing performance are prevented even in a high-temperature and high-humidity state; and the light leakage at the orthogonal position in the visible region is low, and is especially suitable for vehicular or outdoor display devices, security devices necessitating high reliability, and the like.

The near infrared polarizing plate for vehicular or outdoor display devices, or the neutral gray polarizing plate having a polarizing function in the near infrared region is preferably a polarizing plate with an AR layer in which a polarizing plate composed of a polarizing film and a protecting film is installed with the AR layer in order to more improve the single plate light transmittance, and more preferably a polarizing plate with an AR layer and a support in which the support such as a transparent resin is further installed. The AR layer can be installed on one surface or both surfaces of the polarizing plate. The support is preferably installed on one surface of the polarizing plate and may be installed through the AR layer or directly on the polarizing plate. The support is preferably one having a plain surface portion to laminate the polarizing plate on, and is, since being applied to optical usage, preferably a transparent substrate. The transparent substrate is classified roughly into inorganic substrates and organic substrates, and includes inorganic substrates such as soda glass, borosilicate glass, quartz, sapphire and spinel substrates, and organic substrates such as acryl, polycarbonate, polyethylene terephthalate, polyethylene naphthalate and cycloolefin polymer; and the organic substrates are preferable. The thickness and the size of the transparent substrate may be any desired size.

The near infrared polarizing plate is, since being excellent in the polarizing performance and causing no color change nor reduction of the polarizing performance even in a high-temperature and high-humidity state, suitable for devices for liquid crystal projectors, vehicular devices, outdoor display devices, and security devices necessitating high reliability. A polarizing film to be used for these polarizing plates is produced also by the method described in the production method of the dye polarizing film of the present invention, and a protecting film is further affixed to make the polarizing plate, and as required, a protecting layer or an AR layer and a support and the like are installed.

The near infrared polarizing plate with a support for vehicular or outdoor display devices, or the neutral polarizing plate or the color polarizing plate having the polarizing function in the near infrared region can be produced, for example, by applying a transparent adhesive agent (pressure-sensitive adhesive agent) on a plain surface portion of the support and then laminating a dye polarizing plate on the applied surface. Alternatively, a transparent adhesive agent (pressure-sensitive adhesive agent) may be applied on a dye polarizing plate and then, the support may be laminated on the applied surface. The adhesive agent (pressure-sensitive adhesive agent) to be used here is preferably, for example, an acrylate ester one. Here, in the case of using the dye polarizing plate as an elliptically polarizing plate, although it is usual that a retardation plate side is laminated on the support side, the polarizing plate side may be laminated on a transparent substrate.

EXAMPLES

Hereinafter, the present invention will be described in more detail by way of Examples, however these are exemplary and do not any more limit the present invention. The units "%" and "parts" in Examples are in terms of mass unless otherwise specified.

Example 1

(Step 1)
To 500 parts of water, 22.3 parts of 4-amino-1-naphthalenesulfonic acid was added, and dissolved by using a 25% sodium hydroxide; and thereafter, a 35% hydrochloric acid was added to adjust the pH to 0.2. To the obtained liquid, 17.3 parts of a 40% sodium nitrite aqueous solution was added to prepare a diazo liquid. Separately, to 200 parts of water, 22.3 parts of 8-aminonaphthalene-2-sulfonic acid was added, and was weakly alkalified with a 25% sodium hydroxide aqueous solution to be dissolved. To the resultant liquid, the previously obtained diazo liquid was dropped while keeping the pH at 4.5 to 6.0 and stirred to complete a coupling reaction. Thereafter, the resultant was salted out with sodium chloride, and thereafter filtered to obtain 122 parts of a wet cake of the monoazo compound represented by formula (28).

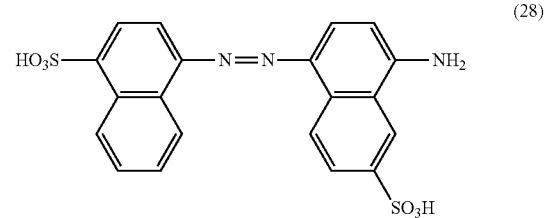 [SMILES: Nc1ccc(N=Nc2ccc(S(=O)(=O)O)c3ccccc23)c2ccc(S(=O)(=O)O)cc12]

(Step 2)

To 300 parts of water, 122 parts of the obtained wet cake of the monoazo compound (28) was added, and stirred and suspended. The pH of the suspension liquid was adjusted at 9.0 by using a 25% sodium hydroxide; and to the resultant, 13.8 parts of a 40% sodium nitrite aqueous solution was added. The obtained suspension liquid was dropped in a mixed liquid of 100 parts of water and 33.4 parts of a 35% hydrochloric acid to prepare a diazo liquid. Separately, to 200 parts of water, 17.8 parts of 8-aminonaphthalene-2-sulfonic acid was added, and was weakly alkalified with a 25% sodium hydroxide aqueous solution to be dissolved. To the resultant liquid, the previously obtained diazo liquid was dropped while keeping the pH at 4.5 to 6.0 and stirred to complete a coupling reaction. Thereafter, the resultant was salted out with sodium chloride, and thereafter filtered to obtain 129 parts of a wet cake of the disazo compound represented by formula (29).

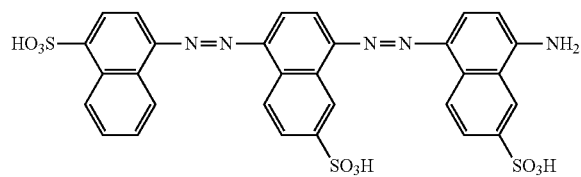

(29)

(Step 3)

To 300 parts of water, 129 parts of the obtained wet cake of the disazo compound (29) was added, and stirred and suspended. The pH of the suspension liquid was adjusted at 9.0 by using a 25% sodium hydroxide; and to the resultant, 9.7 parts of a 40% sodium nitrite aqueous solution was added. The obtained suspension liquid was dropped in a mixed liquid of 100 parts of water and 23.3 parts of a 35% hydrochloric acid to prepare a diazo liquid. Separately, to 200 parts of water, 10.0 parts of 1,5-dihydroxynaphthalene-2,6-disulfonic acid was added, and was weakly alkalified with a 25% sodium hydroxide aqueous solution to be dissolved. To the resultant liquid, the previously obtained diazo liquid was dropped while keeping the pH at 6.5 to 8.0 and stirred to complete a coupling reaction. Thereafter, the resultant was salted out with sodium chloride, and thereafter filtered and dried to obtain 28.6 parts of the azo compound represented by formula (7).

<Production of a Polarizing Film and a Polarizing Plate>

A polyvinyl alcohol film (manufactured by Kuraray Co., Ltd., VF-PS #7500) having a degree of saponification of 99% or higher and an average degree of polymerization of 2,400 was dipped in warm water at 45° C. to be applied to a swelling treatment, and stretched to a stretch ratio of 1.30 times. The swollen film was dipped for 10 min in a dyeing solution at 45° C. containing 1,500 parts by mass of water, 1.5 parts by mass of anhydrous mirabilite and 0.30 part by mass of the azo compound (7) to cause the film to contain the azo compound. The obtained film was dipped for 1 min in an aqueous solution at 40° C. containing 20 g/l boric acid (manufactured by Societa Chimica Larderello s.p.a). The film after the dipping was subjected for 5 min to a stretch treatment being stretched to 5.0 times in an aqueous solution at 50° C. containing 30.0 g/l of boric acid. The obtained film was dipped for 20 s in water at 25° C. with the stretched state being held to be subjected to a cleaning treatment. The film after the cleaning was dried at 70° C. for 9 min to obtain a polarizing film. An alkali-treated triacetylcellulose film (manufactured by Fujifilm Corp., TD-80) was laminated on the polarizing film by using, as an adhesive agent, a polyvinyl alcohol (manufactured by Japan VAM & Poval Co., Ltd., NH-26) dissolved in 4% in water, to obtain a polarizing plate. The obtained polarizing plate retained the optical performance, particularly the transmittance, the degree of polarization and the like, which the above polarizing film had. The polarizing plate was taken as a measuring sample of Example 1.

Example 2

(Step 1)

To 500 parts of water, 30.3 parts of 7-amino-1,3-naphthalenedisulfonic acid was added, and dissolved by using a 25% sodium hydroxide; and thereafter, a 35% hydrochloric acid was added to adjust the pH to 0.2. To the obtained liquid, 17.3 parts of a 40% sodium nitrite aqueous solution was added to prepare a diazo liquid. Separately, to 200 parts of water, 23.9 parts of 5-amino-1-naphthol-3-sulfonic acid was added, and was weakly alkalified with a 25% sodium hydroxide aqueous solution to be dissolved. To the resultant liquid, the previously obtained diazo liquid was dropped while keeping the pH at 4.5 to 6.0 and stirred to complete a coupling reaction. Thereafter, the resultant was salted out with sodium chloride, and thereafter filtered to obtain 129 parts of a wet cake of the monoazo compound represented by formula (30).

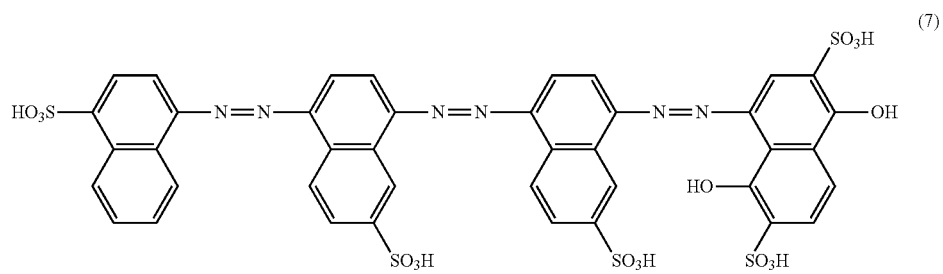 [SMILES: O=S(=O)(O)c1ccc2c(N=Nc3ccc(S(=O)(=O)O)c4ccccc34)ccc(N=Nc3ccc(N=Nc4cc(S(=O)(=O)O)c(O)c5ccc(S(=O)(=O)O)c(O)c45)c4cc(S(=O)(=O)O)ccc34)c2c1]

(7)

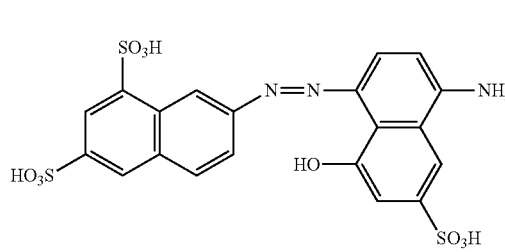

(30)

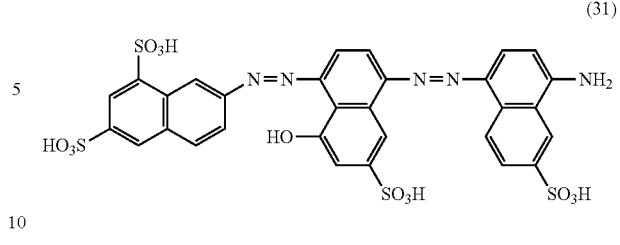

(31)

(Step 2)

To 300 parts of water, 129 parts of the obtained wet cake of the monoazo compound (30) was added, and stirred and suspended. The pH of the suspension liquid was adjusted at 9.0 by using a 25% sodium hydroxide; and to the resultant, 12.1 parts of a 40% sodium nitrite aqueous solution was added. The obtained suspension liquid was dropped in a mixed liquid of 100 parts of water and 29.2 parts of a 35% hydrochloric acid to prepare a diazo liquid. Separately, to 200 parts of water, 15.6 parts of 8-aminonaphthalene-2-sulfonic acid was added, and was weakly alkalified with a 25% sodium hydroxide aqueous solution to be dissolved. To the resultant liquid, the previously obtained diazo liquid was dropped while keeping the pH at 4.5 to 6.0 and stirred to complete a coupling reaction. Thereafter, the resultant was salted out with sodium chloride, and thereafter filtered to obtain 110 parts of the wet cake of a disazo compound represented by formula (31).

(Step 3)

To 300 parts of water, 110 parts of the obtained wet cake of the disazo compound (31) was added, and stirred and suspended. The pH of the suspension liquid was adjusted at 9.0 by using a 25% sodium hydroxide; and to the resultant, 7.3 parts of a 40% sodium nitrite aqueous solution was added. The obtained suspension liquid was dropped in a mixed liquid of 100 parts of water and 17.5 parts of a 35% hydrochloric acid to prepare a diazo liquid. Separately, to 200 parts of water, 10.0 parts of 5-amino-1-naphthol-3-sulfonic acid was added, and was weakly alkalified with a 25% sodium hydroxide aqueous solution to be dissolved. To the resultant liquid, the previously obtained diazo liquid was dropped while keeping the pH at 4.5 to 6.0 and stirred to complete a coupling reaction. Thereafter, the resultant was salted out with sodium chloride, and thereafter filtered and dried to obtain 72.5 parts of a wet cake of the trisazo compound represented by formula (32).

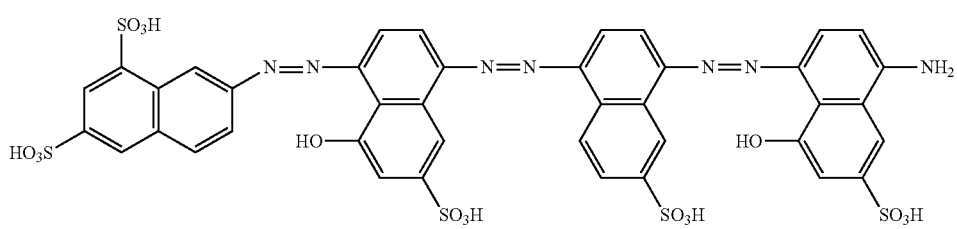

(32)

(Step 4)

To 300 parts of water, 72.5 parts of the obtained wet cake of the trisazo compound (32) was added, and stirred and suspended, and stirred at 70 to 75° C. for 3 days with the pH of the suspension liquid being held at 4.0 to 4.5 by using a 35% hydrochloric acid. Thereafter, the resultant was salted out with sodium chloride, and thereafter filtered and dried to obtain 8.7 parts of the azo compound represented by formula (9).

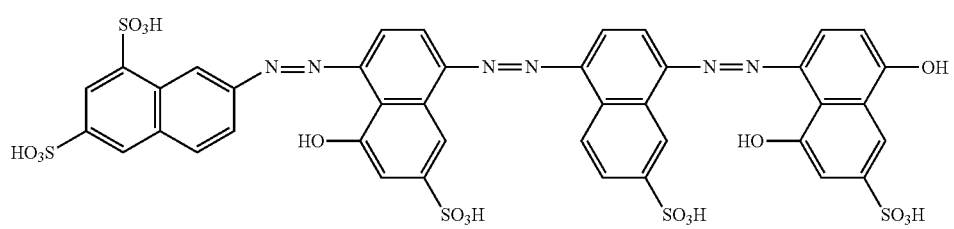

(9)

29

<Production of a Polarizing Film and a Polarizing Plate>

A polarizing plate was produced in the same manner as Example 1, except for using the above compound (9) in place of the compound (7) used in production of the polarizing film in Example 1, and was taken as a measuring sample of Example 2.

Example 31

(Step 1)

To 200 parts of water, 31.9 parts of 4-amino-5-hydroxy-2,7-naphthalenedisulfonic acid was added, and dissolved by using a 25% sodium hydroxide; thereafter, 19.1 parts of 4-toluenesulfonyl chloride was dropped while keeping the pH at 10.5 to 11.0, and stirred to complete the reaction. Thereafter, the resultant was salted out with sodium chloride, and thereafter filtered to obtain 142 parts of a wet cake of the compound represented by formula (33).

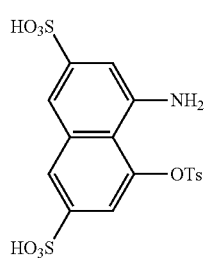
(33)

(Step 2)

To 300 parts of water, 142 parts of the obtained wet cake of the compound (33) was added, and stirred and suspended. The pH of the suspension liquid was adjusted at 9.0 by using a 25% sodium hydroxide; and to the resultant, 15.5 parts of a 40% sodium nitrite aqueous solution was added. The obtained suspension liquid was dropped in a mixed liquid of 100 parts of water and 37.5 parts of a 35% hydrochloric acid to prepare a diazo liquid. Separately, to 200 parts of water, 20.1 parts of 8-aminonaphthalene-2-sulfonic acid was added, and was weakly alkalified with a 25% sodium hydroxide aqueous solution to be dissolved. To the resultant liquid, the previously obtained diazo liquid was dropped while keeping the pH at 4.5 to 6.0 and stirred to complete a coupling reaction. Thereafter, the resultant was salted out with sodium chloride, and thereafter filtered to obtain 148 parts of a wet cake of the monoazo compound represented by formula (34).

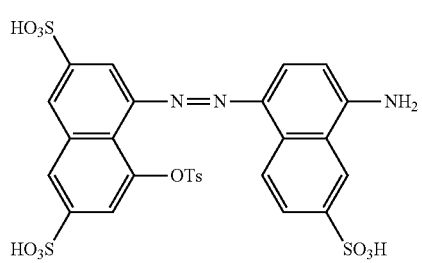
(34)

30

(Step 3)

To 300 parts of water 148 parts of the obtained wet cake of the monoazo compound (34) was added, and stirred and suspended. The pH of the suspension liquid was adjusted at 9.0 by using a 25% sodium hydroxide; and to the resultant, 10.9 parts of a 40% sodium nitrite aqueous solution was added. The obtained suspension liquid was dropped in a mixed liquid of 100 parts of water and 26.3 parts of a 35% hydrochloric acid to prepare a diazo liquid. Separately, to 200 parts of water, 14.0 parts of 8-aminonaphthalene-2-sulfonic acid was added, and was weakly alkalified with a 25% sodium hydroxide aqueous solution to be dissolved. To the resultant liquid, the previously obtained diazo liquid was dropped while keeping the pH at 4.5 to 6.0 and stirred to complete a coupling reaction. Thereafter, the resultant was salted out with sodium chloride, and thereafter filtered to obtain 138 parts of a wet cake of the disazo compound represented by formula (35).

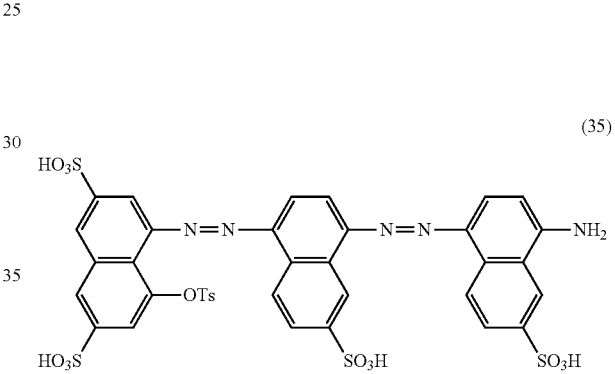
(35)

(Step 4)

To 300 parts of water, 138 parts of the obtained wet cake of the disazo compound (35) was added, and stirred and suspended; the pH of the suspension liquid was adjusted at 9.0 by using a 25% sodium hydroxide; and to the resultant, 7.6 parts of a 40% sodium nitrite aqueous solution was added. The obtained suspension liquid was dropped in a mixed liquid of 100 parts of water and 18.4 parts of a 35% hydrochloric acid to prepare a diazo liquid. Separately, to 150 parts of water, 14.1 parts of 1,5-dihydroxynaphthalene-2,6-disulfonic acid was added, and was weakly alkalified with a 25% sodium hydroxide aqueous solution to be dissolved. To the resultant liquid, the previously obtained diazo liquid was dropped while keeping the pH at 6.5 to 8.0 and stirred to complete a coupling reaction. Thereafter, the resultant was salted out with sodium chloride, and thereafter filtered and dried to obtain 74.6 parts of a wet cake of the trisazo compound represented by formula (36).

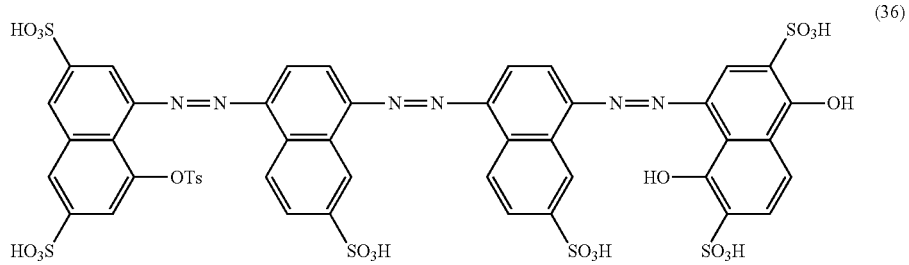 [SMILES: Cc1ccc(S(=O)(=O)Oc2cc(S(=O)(=O)O)cc3cc(S(=O)(=O)O)cc(N=Nc4ccc(N=Nc5ccc(N=Nc6cc(S(=O)(=O)O)c(O)c7ccc(S(=O)(=O)O)c(O)c67)c6cc(S(=O)(=O)O)ccc56)c5cc(S(=O)(=O)O)ccc45)c23)cc1]

(36)

(Step 5)

To 300 parts of water, 74.6 parts of the obtained wet cake of the trisazo compound (36) was added, and stirred and suspended, and stirred at 50 to 55° C. for 2 days with the pH of the suspension liquid being held at 10.0 to 10.5 by using a 25% sodium hydroxide. Thereafter, the resultant was salted out with sodium chloride, and thereafter filtered and dried to obtain 9.0 parts of the azo compound represented by formula (11).

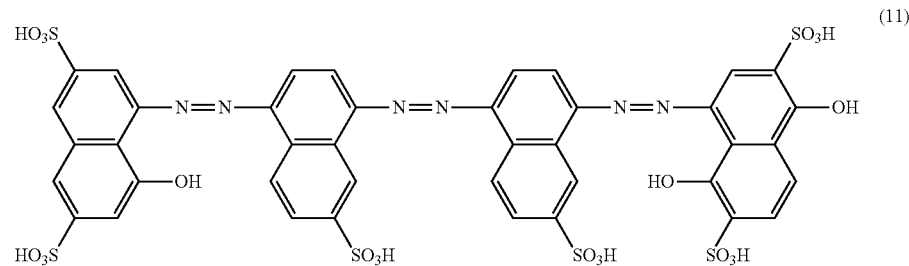 [SMILES: O=S(=O)(O)c1cc(O)c2c(N=Nc3ccc(N=Nc4ccc(N=Nc5cc(S(=O)(=O)O)c(O)c6ccc(S(=O)(=O)O)c(O)c56)c5cc(S(=O)(=O)O)ccc45)c4cc(S(=O)(=O)O)ccc34)cc(S(=O)(=O)O)cc2c1]

(11)

<Production of a Polarizing Film and a Polarizing Plate>

A polarizing plate was produced in the same manner as Example 1, except for using the above compound (11) in place of the compound (7) used in production of the polarizing film in Example 1, and was taken as a measuring sample of Example 3.

Example 4

8.5 parts of the azo compound represented by the following formula (13) was obtained in the same manner as Example 3, except for using 23.9 parts of 1-amino-8-naphthol-4-sulfonic acid in place of 4-amino-5-hydroxy-2,7-naphthalenedisulfonic acid.

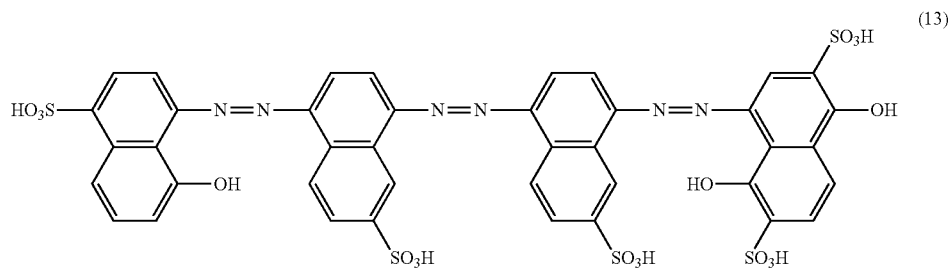 [SMILES: O=S(=O)(O)c1ccc2c(N=Nc3ccc(S(=O)(=O)O)c4cccc(O)c34)ccc(N=Nc3ccc(N=Nc4cc(S(=O)(=O)O)c(O)c5ccc(S(=O)(=O)O)c(O)c45)c4cc(S(=O)(=O)O)ccc34)c2c1]

(13)

<Production of a Polarizing Film and a Polarizing Plate>

A polarizing plate was produced in the same manner as Example 1, except for using the above compound (13) in place of the compound (7) used in production of the polarizing film in Example 1, and was taken as a measuring sample of Example 4.

Example 51

(Step 1)

To 300 parts of water, 138 parts of the obtained wet cake of the disazo compound (35) obtained in Example 3 was added, and stirred and suspended. The pH of the suspension liquid was adjusted at 9.0 by using a 25% sodium hydroxide; and to the resultant, 7.6 parts of a 40% sodium nitrite aqueous solution was added. The obtained suspension liquid was dropped in a mixed liquid of 100 parts of water and 18.4 parts of a 35% hydrochloric acid to prepare a diazo liquid. Separately, to 150 parts of water, 9.8 parts of 8-aminonaphthalene-2-sulfonic acid was added, and was weakly alkalified with a 25% sodium hydroxide aqueous solution to be dissolved. To the resultant liquid, the previously obtained diazo liquid was dropped while keeping the pH at 4.5 to 6.0 and stirred to complete a coupling reaction. Thereafter, the resultant was salted out with sodium chloride, and thereafter filtered to obtain 86.3 parts of a wet cake of the trisazo compound represented by formula (37).

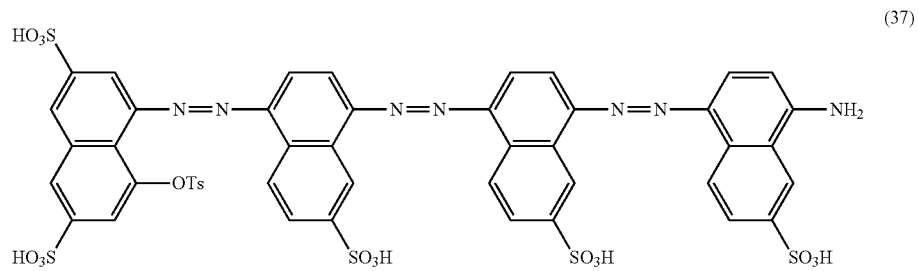 [SMILES: Cc1ccc(S(=O)(=O)Oc2cc(S(=O)(=O)O)cc3cc(S(=O)(=O)O)cc(N=Nc4ccc(N=Nc5ccc(N=Nc6ccc(N)c7cc(S(=O)(=O)O)ccc67)c6cc(S(=O)(=O)O)ccc56)c5cc(S(=O)(=O)O)ccc45)c23)cc1]

(37)

(Step 2)

To 300 parts of water, 86.3 parts of the obtained wet cake of the trisazo compound (37) was added, and stirred and suspended, and stirred at 55 to 60° C. for 3 days with the pH being held at 10.0 to 10.5 by using a 25% sodium hydroxide. Thereafter, the resultant was salted out with sodium chloride, and thereafter filtered and dried to obtain 5.0 parts of the azo compound represented by formula (14).

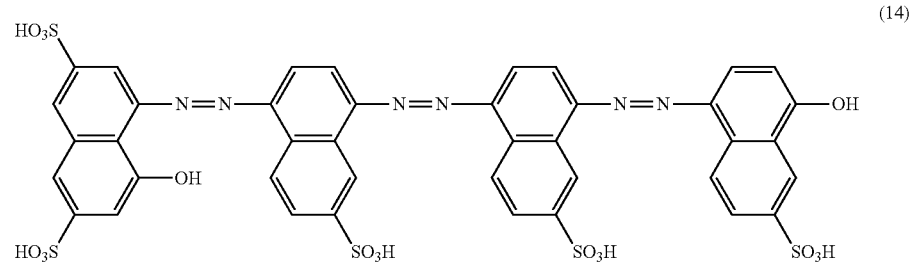 [SMILES: O=S(=O)(O)c1cc(O)c2c(N=Nc3ccc(N=Nc4ccc(N=Nc5ccc(O)c6cc(S(=O)(=O)O)ccc56)c5cc(S(=O)(=O)O)ccc45)c4cc(S(=O)(=O)O)ccc34)cc(S(=O)(=O)O)cc2c1]

(14)

<Production of a Polarizing Film and a Polarizing Plate>

A polarizing plate was produced in the same manner as Example 1, except for using the above compound (14) in place of the compound (7) used in production of the polarizing film in Example 1, and applying, in the stretch treatment, a stretch treatment in an aqueous solution at 50° C. containing 15.0 g/l of boric acid and 15.0 g/l of borax for 5 min, and was taken as a measuring sample of Example 5.

Example 6

8.5 parts of an azo compound represented by the following formula (15) was obtained in the same manner as Example 3, except for using 13.8 parts of 2,5-dimethoxyaniline in place of 8-aminonaphthalene-2-sulfonic acid in the monoazo synthesis step.

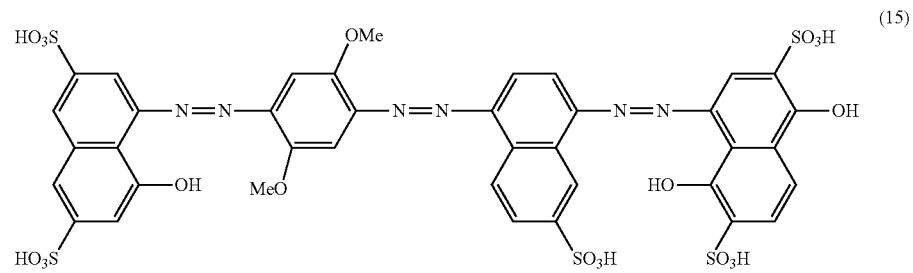 [SMILES: COc1cc(N=Nc2cc(S(=O)(=O)O)cc3cc(S(=O)(=O)O)cc(O)c23)c(OC)cc1N=Nc1ccc(N=Nc2cc(S(=O)(=O)O)c(O)c3ccc(S(=O)(=O)O)c(O)c23)c2cc(S(=O)(=O)O)ccc12]

(15)

<Production of a Polarizing Film and a Polarizing Plate>

A polarizing plate was produced in the same manner as Example 1, except for using the above compound (15) in place of the compound (7) used in production of the polarizing film in Example 1, and was taken as a measuring sample of Example 6.

Example 7

(Step 1)

To 300 parts of water, 86.3 parts of the obtained wet cake of the trisazo compound (37) obtained in Example 5 was added, and stirred and suspended. The pH of the suspension liquid was adjusted at 9.0 by using a 25% sodium hydroxide; and to the resultant, 7.6 parts of a 40% sodium nitrite aqueous solution was added. The obtained suspension liquid was dropped in a mixed liquid of 100 parts of water and 18.4 parts of a 35% hydrochloric acid to prepare a diazo liquid. Separately, to 180 parts of water, 7.0 parts of 1,5-dihydroxynaphthalene-2,6-disulfonic acid was added, and was weakly alkalified with a 25% sodium hydroxide aqueous solution to be dissolved. To the resultant liquid, the previously obtained diazo liquid was dropped while keeping the pH at 6.5 to 8.0 and stirred to complete a coupling reaction. Thereafter, the resultant was salted out with sodium chloride, and thereafter filtered to obtain 27.6 parts of a wet cake of the tetrakisazo compound represented by formula (38).

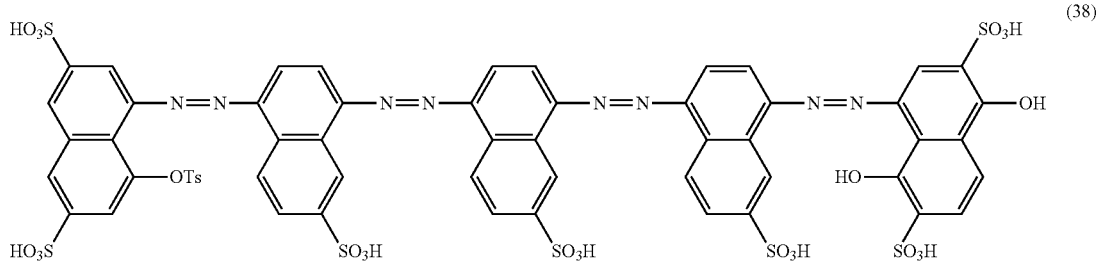 [SMILES: Cc1ccc(S(=O)(=O)Oc2cc(S(=O)(=O)O)cc3cc(S(=O)(=O)O)cc(N=Nc4ccc(N=Nc5ccc(N=Nc6ccc(N=Nc7cc(S(=O)(=O)O)c(O)c8ccc(S(=O)(=O)O)c(O)c78)c7cc(S(=O)(=O)O)ccc67)c6cc(S(=O)(=O)O)ccc56)c5cc(S(=O)(=O)O)ccc45)c23)cc1]

(38)

(Step 2)

To 200 parts of water, 27.6 parts of the obtained wet cake of the tetrakisazo compound (38) was added, and stirred and suspended, and stirred at 50 to 55° C. for 2 days with the pH of the suspension liquid being held at 10.0 to 10.5 by using a 25% sodium hydroxide. Thereafter, the resultant was salted out with sodium chloride, and thereafter filtered and dried to obtain 3.0 parts of the azo compound represented by formula (27).

<Production of a Polarizing Film and a Polarizing Plate>

A polarizing plate was produced in the same manner as Example 1, except for using the above compound (39) in place of the compound (7) used in production of the polarizing film in Example 1, and was taken as a measuring sample of Comparative Example 1.

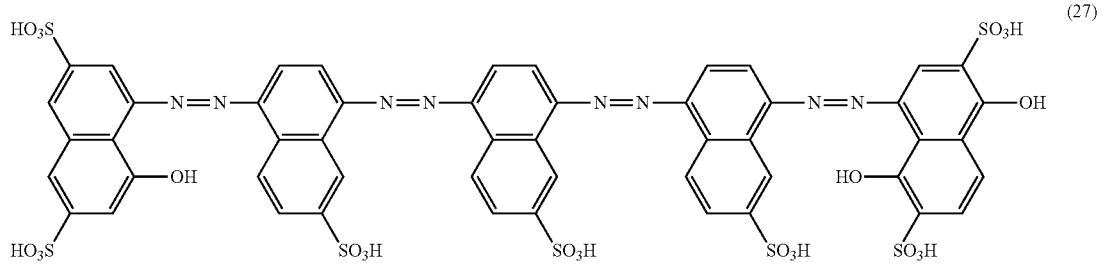 [SMILES: O=S(=O)(O)c1cc(O)c2c(N=Nc3ccc(N=Nc4ccc(N=Nc5ccc(N=Nc6cc(S(=O)(=O)O)c(O)c7ccc(S(=O)(=O)O)c(O)c67)c6cc(S(=O)(=O)O)ccc56)c5cc(S(=O)(=O)O)ccc45)c4cc(S(=O)(=O)O)ccc34)cc(S(=O)(=O)O)cc2c1]

(27)

<Production of a Polarizing Film and a Polarizing Plate>

A polarizing plate was produced in the same manner as Example 1, except for using the above compound (27) in place of the compound (7) used in production of the polarizing film in Example 1, and was taken as a measuring sample of Example 7.

Comparative Example 1

To 200 parts of water, 14 parts of 4-((4-aminophenyl)diazenyl)benzenesulfonic acid was added, and stirred and suspended. The pH was adjusted at 9.0 by using a 25% sodium hydroxide; and 9.1 parts of a 40% sodium nitrite aqueous solution was added to the resultant. The obtained suspension liquid was dropped in a mixed liquid of 100 parts of water and 20 parts of a 35% hydrochloric acid to prepare a diazo liquid. Separately, to 200 parts of water, 16.0 parts of 1,5-dihydroxynaphthalene was added, and was weakly alkalified with a 25% sodium hydroxide aqueous solution to be dissolved. To the resultant liquid, the previously obtained diazo liquid was dropped while keeping the pH at 6.5 to 8.0 and stirred to complete a coupling reaction. Thereafter, the resultant was salted out with sodium chloride, and thereafter filtered and dried to obtain 10.0 parts of the azo compound represented by formula (39).

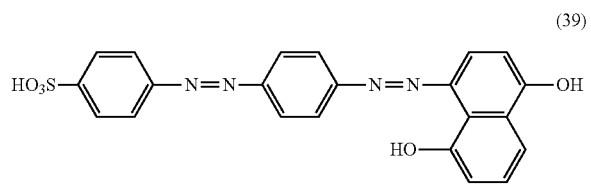 [SMILES: O=S(=O)(O)c1ccc(N=Nc2ccc(N=Nc3ccc(O)c4cccc(O)c34)cc2)cc1]

(39)

Comparative Example 2

<Production of a Polarizing Film and a Polarizing Plate>

A polarizing plate was produced in the same manner as Example 1, except for using the following compound (40) in place of the compound (7) used in production of the polarizing film in Example 1, and was taken as a measuring sample of Comparative Example 2.

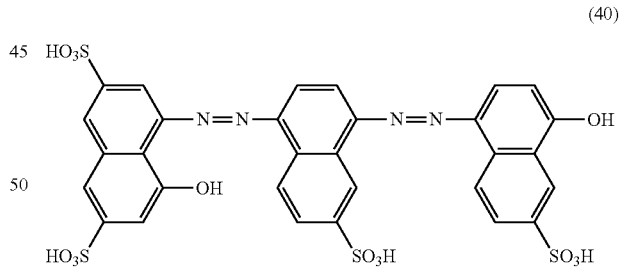

(40)

Comparative Example 3

<Production of a Polarizing Film and a Polarizing Plate>

A polarizing plate was produced in the same manner as Example 1, except for using the following compound (41) described in Example 2 in JP 2003-64276 A in place of the compound (7) used in production of the polarizing film in Example 1, and was taken as a measuring sample of Comparative Example 3.

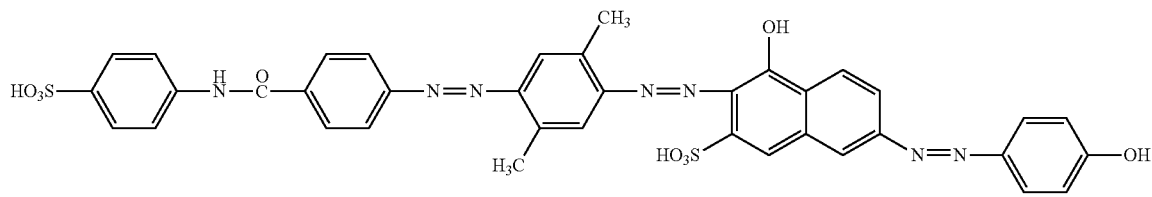

(41)

Comparative Example 4

<Production of a Polarizing Film and a Polarizing Plate>

A polarizing plate was produced in the same manner as Example 1, except for using the following compound (42) described in Example 2 in JP 60-168743 B in place of the compound (7) used in production of the polarizing film in Example 1, and was taken as a measuring sample of Comparative Example 4.

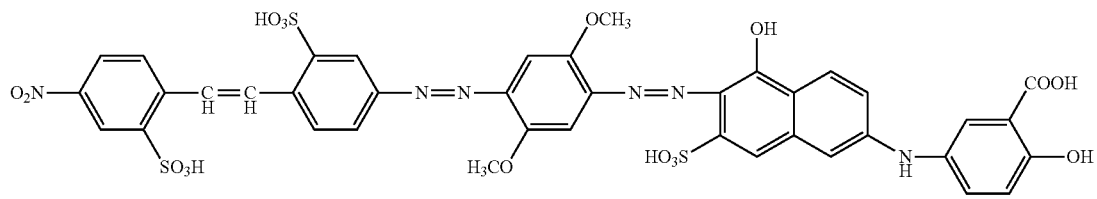

(42)

Comparative Example 5

<Production of a Polarizing Film and a Polarizing Plate>

A polarizing plate was produced in the same manner as Example 1, except for using the following compound (43) described in compound example No. 1 in JP 2001-56412 A in place of the compound (7) used in production of the polarizing film in Example 1, and was taken as a measuring sample of Comparative Example 5.

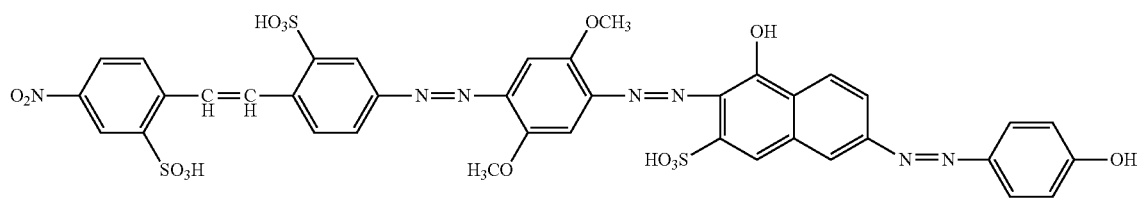

(43)

Comparative Example 6

<Production of a Polarizing Film and a Polarizing Plate>

A polarizing plate was produced in the same manner as Example 1, except for using the following compound (44) described in JP 11-269136 A in place of the compound (7) used in production of the polarizing film in Example 1, and was taken as a measuring sample of Comparative Example 6. However, the following compound (44) not only did not dissolve in water but also was not contained in a polyvinyl alcohol film; that is, the film did not function as a polarizing film.

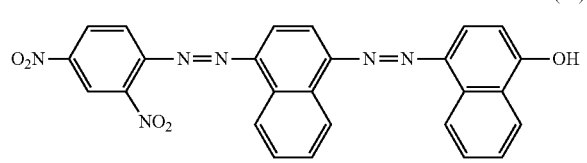

(44)

Further, there were ascertained a wavelength region where the dichroic ratio indicated a value equal to or higher than 5, and a wavelength region where the dichroic ratio indicated a value equal to or higher than 10. The results are shown in Table 1. Here, the measuring sample of Comparative Example 6, since exhibiting no polarizing function, is not described in Table 1.

$$\text{Transmittance (\%)} = (Ky+Kz)/2 \qquad \text{(i)}$$

$$\text{Degree of polarization (\%)} = [(Ky-Kz)/(Ky+Kz)] \times 100 \qquad \text{(ii)}$$

TABLE 1

| | $\lambda$max (nm) | Ky at $\lambda$max (%) | Kz at $\lambda$max (%) | Single transmittance at $\lambda$max (%) | Degree of polarization at $\lambda$max(%) | Rd at $\lambda$max | Wavelength region having Rd of 5 or higher (nm) | Wavelength region having Rd of 10 or higher (nm) |
|---|---|---|---|---|---|---|---|---|
| Example 1 | 690 | 82.87 | 0.69 | 41.78 | 98.35 | 26.49 | 420-970 | 530-920 |
| Example 2 | 710 | 74.50 | 0.015 | 37.26 | 99.96 | 29.91 | 480-1100 | 550-1070 |
| Example 3 | 830 | 73.40 | 0.004 | 36.70 | 99.99 | 33.18 | 470-1200 | 530-1100 |
| Example 4 | 820 | 69.63 | 0.02 | 34.83 | 99.94 | 23.53 | 490-1100 | 590-1060 |
| Example 5 | 690 | 65.90 | 1.29 | 33.60 | 96.16 | 10.43 | 520-1100 | 680-850 |
| Example 6 | 790 | 72.70 | 0.05 | 36.37 | 99.87 | 24.10 | 560-980 | 640-940 |
| Example 7 | 850 | 76.60 | 0.00 | 37.80 | 99.99 | 37.23 | 460-1200 | 610-1100 |
| Comparative Example 1 | 540 | 83.38 | 4.50 | 43.94 | 69.75 | 17.06 | 380-620 | 480-590 |
| Comparative Example 2 | 590 | 59.69 | 15.56 | 37.72 | 58.76 | 3.63 | Absent | Absent |
| Comparative Example 3 | 550 | 86.85 | 0.94 | 43.89 | 97.86 | 33.12 | 380-620 | 390-600 |
| Comparative Example 4 | 610 | 86.18 | 1.30 | 43.74 | 97.02 | 29.19 | 380-690 | 510-680 |
| Comparative Example 5 | 615 | 87.26 | 1.10 | 44.18 | 97.50 | 33.06 | 470-690 | 510-670 |

(Measurement of the Maximum Absorption Wavelength, the Transmittance and the Degree of Polarization of the Polarizing Plates)

For the polarizing plates obtained in Examples 1 to 7 and Comparative Examples 1 to 6, the maximum absorption wavelength, the single transmittance (%) at the wavelength and the degree of polarization (%) thereat were measured. In the measurement of the maximum absorption wavelength (nm, $\lambda$max) of the polarizing plates and the calculation of the degree of polarization, the parallel transmittance (Ky, %) and the orthogonal transmittance (Kz, %) in the polarized light incidence were measured by using a spectrophotometer (manufactured by Hitachi, Ltd., U-4100). Here, the parallel transmittance (Ky) indicates a transmittance when the absorption axis of an absolute polarizer and the absorption axis of a polarizing plate used in measurement are parallel; and the orthogonal transmittance (Kz) indicates a transmittance when the absorption axis of the absolute polarizer and the absorption axis of the polarizing plate used in measurement are orthogonal. The parallel transmittance and the orthogonal transmittance at each wavelength were measured at intervals of 5 nm in 380 to 1,200 nm. By using each measurement value, the single transmittance at each wavelength was calculated by the following expression (i); the degree of polarization at each wavelength was calculated by the following expression (ii); and there were obtained the degree of polarization at a maximum absorption wavelength in 380 to 1,200 nm, the maximum absorption wavelength ($\lambda$max) and the single transmittance thereat. Then, Ky and Kz were converted to absorbances ($A_L$=log(1/(Ky/100)), $A_H$=log(1/(Kz/100))), and the dichroic ratio Rd (=$A_H$/$A_L$=log(Kz/100)/log(Ky/100)) were calculated therefrom.

As seen in Table 1, the polarizing plates obtained in Examples 1 to 7 each had a high polarizing performance in the maximum absorption wavelength ($\lambda$max), and an absorption anisotropy of 5 or higher in the dichroic ratio (Rd) in the near infrared region, that is, a polarizing function. Further, the polarizing plates each developed a dichroic ratio of 10 or higher even in 850 nm or more, that is, had a degree of polarization high in the broad band.

By contrast, in Comparative Examples 1 to 5, the bands exhibiting a dichroic ratio of 5 or higher were all limited to the wavelength region of less than 700 nm. It was found that the compounds of Comparative Examples 1 to 3 and 5, though as described in JP 11-269136 A, at least one —OH group is attached to the p-position of a diazenyl group, had almost no polarizing function in 700 nm or more. In particular, in Comparative Example 2, it was found that the polarizing function was remarkably low because there was no wavelength region where the dichroic ratio was 5 or higher. Further, it was found that Comparative Example 1 using a compound similar to the pigment represented by the structural formula (III) in JP 11-269136 A exhibited a $\lambda$max of 540 nm; Comparative Example 2 using a compound similar to the pigment represented by the structural formula (X) therein exhibited a $\lambda$max of 590 nm; so the both in the polarizing plate state had no maximum absorption wavelength in the near infrared region.

[Production Example of a Neutral Gray Polarizing Plate]

A polarizing film was produced in the same production method for the polarizing film as Example 1, except for using, as a dyeing solution, an aqueous solution at 45° C. containing 0.2% of the compound (11) obtained in Example 3, 0.07% of C.I. Direct Orange 39, 0.02% of C.I. Direct Red 81 and 0.1% of mirabilite. The obtained polarizing film had a single plate average transmittance in 380 to 1,200 nm of 38% and an average light transmittance at the orthogonal position of 0.02%, and had a high degree of polarization exhibiting a dichroic ratio of 10 or higher over the broad band. Further, the parallel position and the orthogonal position both assumed a hue of neutral gray in the hue in the visible region. On each of both surfaces of the polarizing film, one sheet of triacetylcellulose film (TAC film, manufactured by Fujifilm Corp., brand name: TD-80U) was laminated through an adhesive agent of a polyvinyl alcohol aqueous solution. Then, an AR support (manufactured by NOF Corp., ReaLook 4010) was laminated on one of the TAC films by using a pressure-sensitive adhesive agent to obtain a neutral gray dye polarizing plate with an AR support. The obtained polarizing plate, similarly to the polarizing film, assumed a neutral gray hue and had a high degree of polarization from the visible region to the near infrared region. The obtained polarizing plate exhibited durability over a long time even in a high-temperature and high-humidity state, and was excellent also in the light resistance to long-time exposure.

INDUSTRIAL APPLICABILITY

The polarizing film and the polarizing plate obtained by using the azo compound represented by formula (1) or a salt thereof was able to have a high degree of polarization in the infrared region or from the visible region to the infrared region. The obtained polarizing plate exhibits durability over a long time even in a high-temperature and high-humidity state, and is excellent also in the light resistance to long-time exposure, and is thus remarkably useful. Accordingly, the polarizing plate obtained by using the azo compound represented by formula (1) or a salt thereof can be applied to sensors, lenses, switching devices, isolators, cameras, indoor and outdoor measuring instruments, and vehicular devices such as driver sensing modules, which all require a high degree of polarization. Further, the polarizing plate can suitably be used for devices sensing infrared light, for example, infrared panels and spacial infrared touch modules, and by being used concurrently with conventional displays, for example, electronic calculators, watches and clocks, laptop computers, word processors, liquid crystal televisions, polarizing lenses, polarizing eyeglasses and car navigations, is enabled to provide modules not only displaying in the visible region but also making use of infrared light.

The invention claimed is:

1. An azo compound represented by the following formula (1) or a salt thereof:

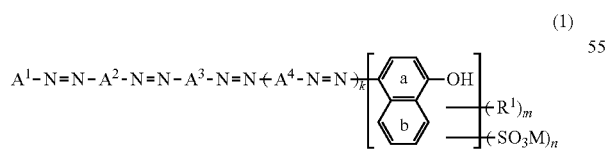

(1)

wherein
$A^1$ represents a naphthyl group which may have a substituent;
$A^2$, $A^3$ and $A^4$ are each independently represented by the following formula (2) or formula (3), and at least one of $A^2$, $A^3$ and $A^4$ is represented by the formula (2):

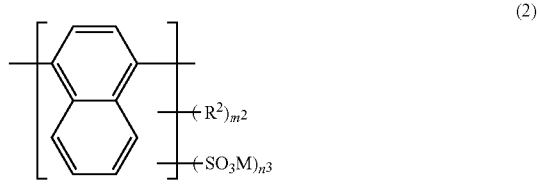

(2)

wherein
$R^2$ represents a hydrogen atom, a hydroxy group, a C1-4 aliphatic hydrocarbon group, a C1-4 alkoxy group, a substituted or unsubstituted amino group, or a C1-4 alkoxy group having a sulfo group;
$m^2$ represents an integer of 0 to 6;
M represents a hydrogen atom or ion, a metal ion or an ammonium ion; and
$n^3$ represents an integer of 0 to 2, and

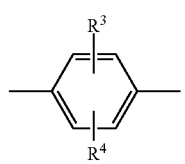

(3)

wherein
$R^3$ and $R^4$ each independently represent a hydrogen atom, a C1-4 aliphatic hydrocarbon group, a C1-4 alkoxy group, a C1-4 alkoxy group having a hydroxy group, or a C1-4 alkoxy group having a sulfo group;
$R^1$ represents a hydrogen atom, a hydroxy group, a C1-4 alkoxy group or a substituted or unsubstituted amino group;
m represents an integer of 0 to 5;
M represents a hydrogen atom or ion, a metal ion, or an ammonium ion;
n represents 1 or 2;
k represents 0 or 1; and
each hydrogen atom on ring a and ring b may be substituted with the substituent $R^1$ or substituent $SO_3M$.

2. The azo compound or a salt thereof according to claim 1, wherein $A^1$ in the above formula (1) represents a naphthyl group having one or more substituents selected from the group consisting of a hydroxy group, a C1-4 alkoxy group having a sulfo group, and a sulfo group.

3. The azo compound or a salt thereof according to claim 1, wherein $A^1$ in the above formula (1) is represented by the following formula (4):

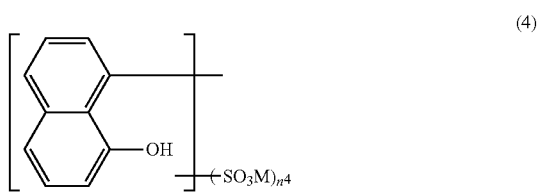

(4)

wherein $n^4$ represents 1 or 2.

4. The azo compound or a salt thereof according to claim 1, wherein the above formula (1) is represented by the following formula (5):

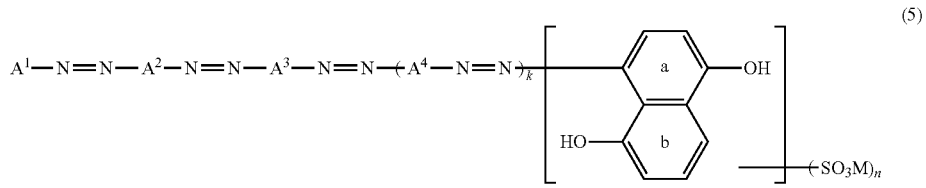

wherein
A$^1$, A$^2$, A$^3$, A$^4$, M, n and k are each the same as those in the above formula (1); and
each hydrogen atom on ring a and ring b may be substituted with a substituent SO$_3$M.

5. The azo compound or a salt thereof according to claim 1, wherein the above formula (1) is represented by the following formula (6):

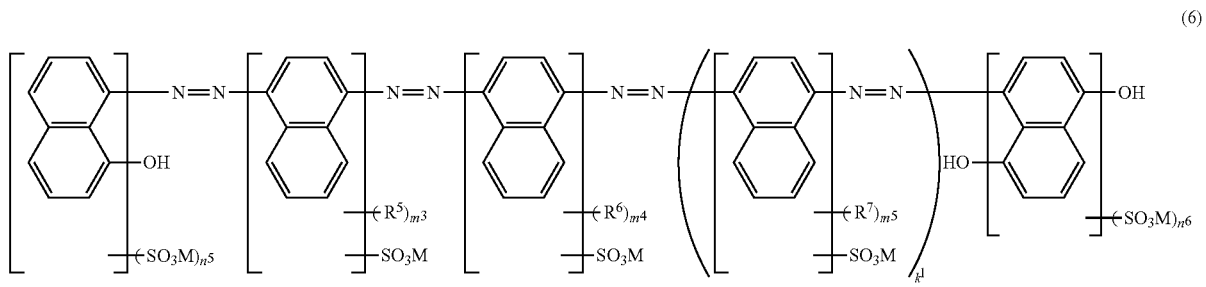

wherein
R$^5$, R$^6$ and R$^7$ each independently represent a hydrogen atom, a hydroxy group, a C1-4 alkoxy group or a substituted or unsubstituted amino group;
m$^3$ to m$^5$ each independently represent an integer of 0 to 5;
M represents a hydrogen atom or ion, a metal ion or an ammonium ion;
n$^5$ and n$^6$ each independently represent 1 or 2; and
k$^1$ represents 0 or 1.

6. A polarizing film, comprising at least one azo compound or a salt thereof according to claim 1.

7. The polarizing film according to claim 6, wherein at least one of wavelengths at which an absorbance ratio Rd=A$_H$/A$_L$ of an absorbance A$_H$ on an axis giving the lowest transmittance of polarized light to an absorbance A$_L$ on an axis giving the highest transmittance of the polarized light indicates a value of 5 or higher is in 700 to 1,500 nm.

8. The polarizing film according to claim 6, further comprising one or more organic dyes other than the azo compound or the salt thereof.

9. The polarizing film according to claim 6, wherein the polarizing film exhibits neutral gray.

10. The polarizing film according to claim 6, using a film comprising a polyvinyl alcohol resin or a derivative thereof as a base material.

11. A polarizing plate, comprising a transparent protection layer on at least one surface of the polarizing film according to claim 6.

12. A display, comprising a polarizing plate according to claim 11.

13. A display, comprising a polarizing film according to claim 6.

14. The display according to claim 13, wherein the display is used for vehicular usage or outdoor display usage.

* * * * *